(12) United States Patent
Yamamoto et al.

(10) Patent No.: US 7,401,928 B2
(45) Date of Patent: Jul. 22, 2008

(54) SCANNING DISPLAY OPTICAL SYSTEM

(75) Inventors: Akira Yamamoto, Yokohama (JP); Naosato Taniguchi, Saitama (JP); Shuichi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 11/143,826

(22) Filed: Jun. 2, 2005

(65) Prior Publication Data
US 2006/0007058 A1    Jan. 12, 2006

(30) Foreign Application Priority Data
Jun. 8, 2004    (JP)    ............................. 2004-170481

(51) Int. Cl.
G02B 5/10    (2006.01)
G03B 21/28    (2006.01)

(52) U.S. Cl. ............................. 353/37; 353/99; 359/858

(58) Field of Classification Search .................. 353/28, 353/30, 34, 37, 94, 98, 99, 78; 348/771; 359/205, 212, 213, 220, 221, 223–226, 850–853, 359/855–864, 868, 869, 631–633
See application file for complete search history.

(56) References Cited

U.S. PATENT DOCUMENTS

| | | | |
|---|---|---|---|
| 5,309,276 A * | 5/1994 | Rodgers | ..................... 359/366 |
| 5,467,104 A | 11/1995 | Furness | |
| 5,701,132 A | 12/1997 | Kollin | |
| 7,130,114 B2 * | 10/2006 | Kurioka | ..................... 359/365 |
| 7,264,360 B2 * | 9/2007 | Hatakeyama et al. | ......... 353/99 |
| 7,374,291 B2 * | 5/2008 | Kurioka | ..................... 353/99 |
| 2004/0105132 A1 * | 6/2004 | Sunaga | ..................... 358/474 |
| 2004/0141221 A1 | 7/2004 | Togino | |

FOREIGN PATENT DOCUMENTS

| | | |
|---|---|---|
| JP | 2001-4955 A | 1/2001 |
| JP | 2001-194617 A | 7/2001 |
| JP | 2004-45496 A | 12/2004 |

* cited by examiner

*Primary Examiner*—Andrew T Sever
(74) *Attorney, Agent, or Firm*—Canon USA Inc IP Div

(57) ABSTRACT

A display optical system includes a light-source unit, a first optical unit which collects a light beam from the light-source unit, a scanning member which scans the light beam from the first optical unit, and a second optical unit which focuses the light beam scanned by the scanning member on about a scanning surface. An optical axis, defined by an optical path along which a light ray travels from the center of the scanning member to the center of the scanning surface via the second optical unit, intersects itself. In addition, the second optical unit includes two reflective mirrors having positive optical powers.

18 Claims, 15 Drawing Sheets

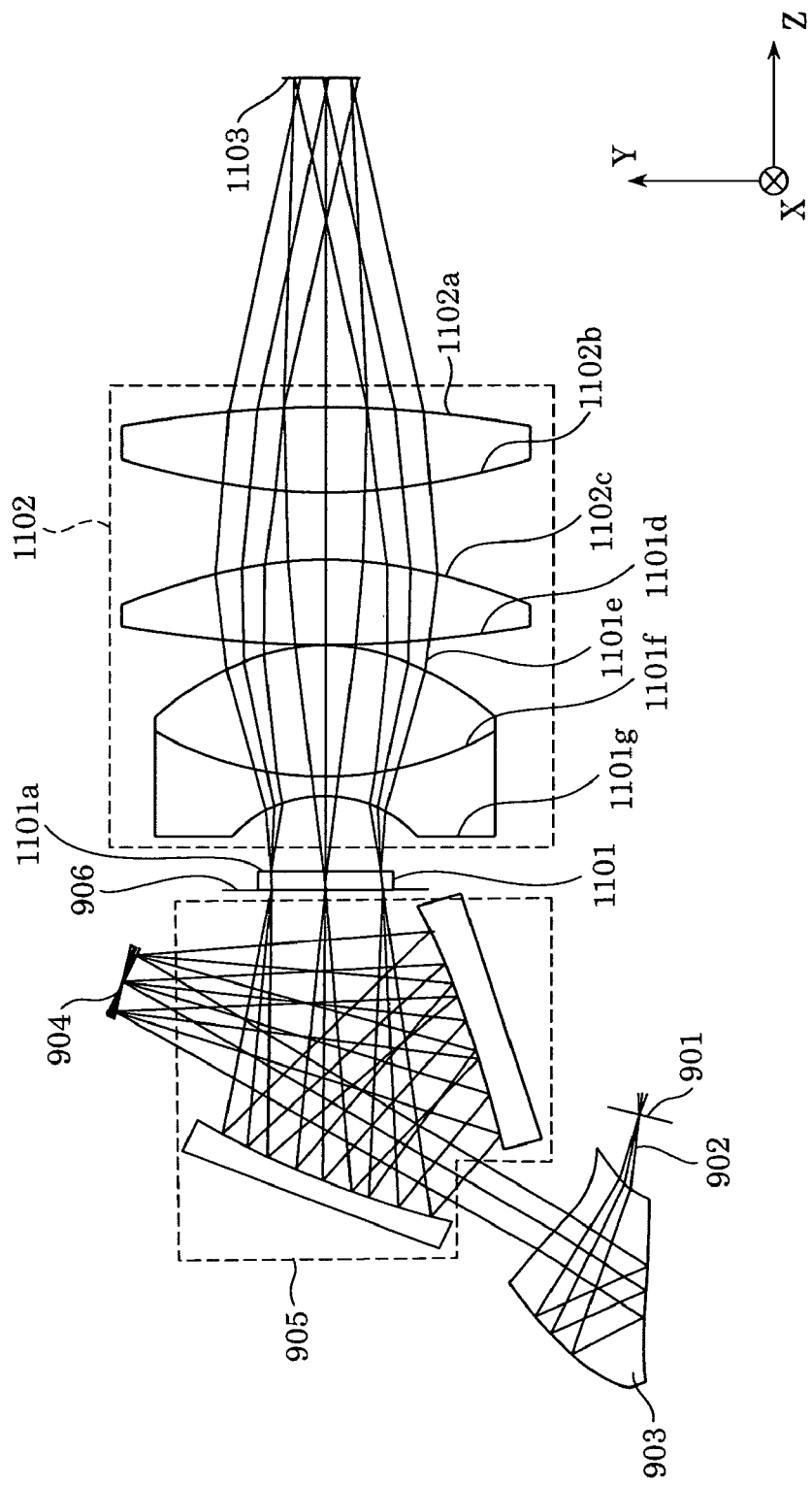

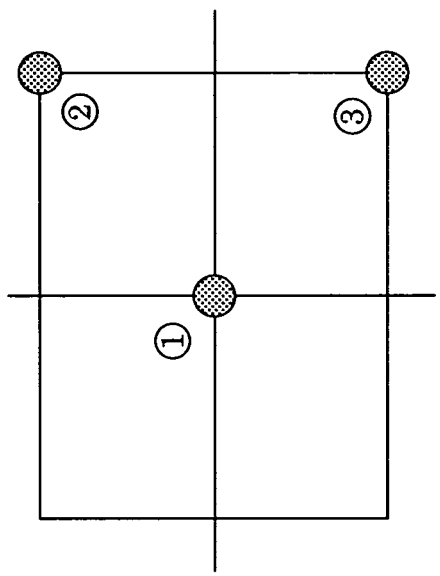
FIG. 12B
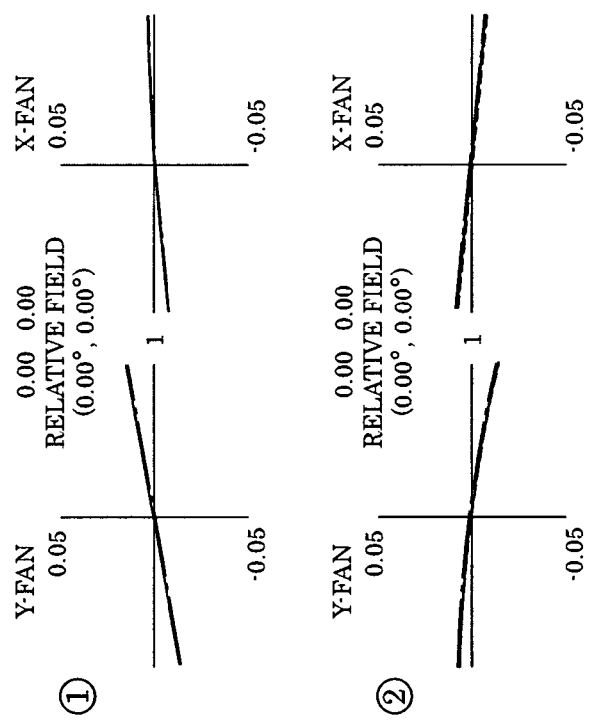
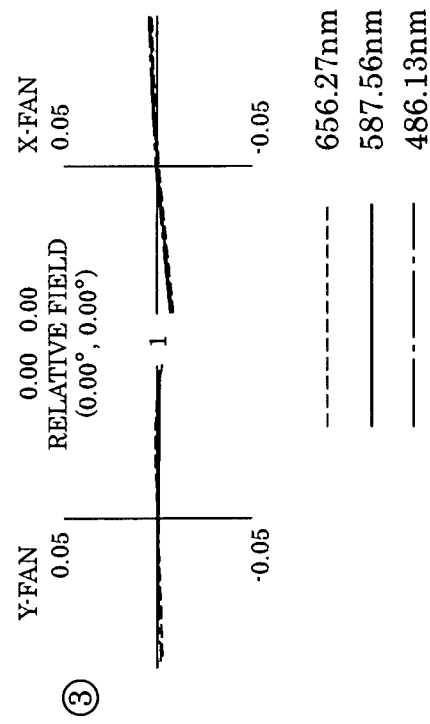
FIG. 12A

FIG. 13B
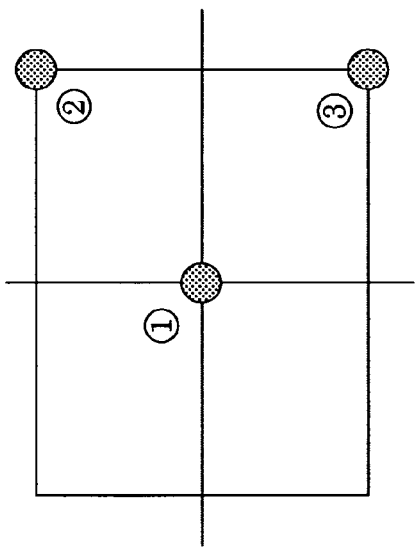
FIG. 13A
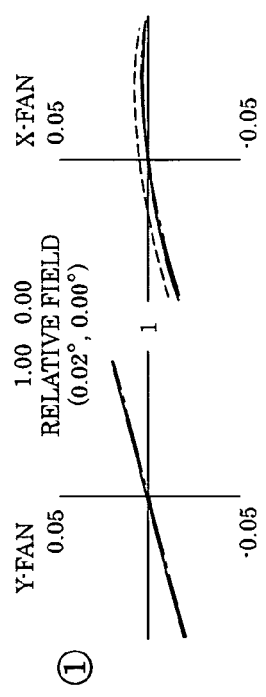
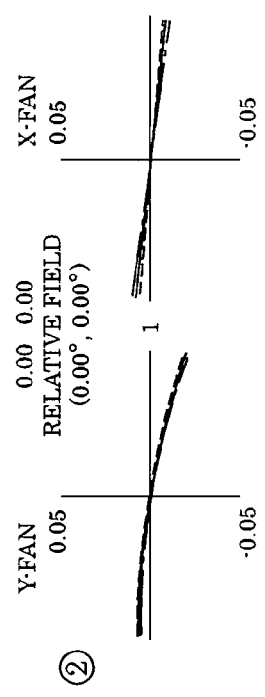
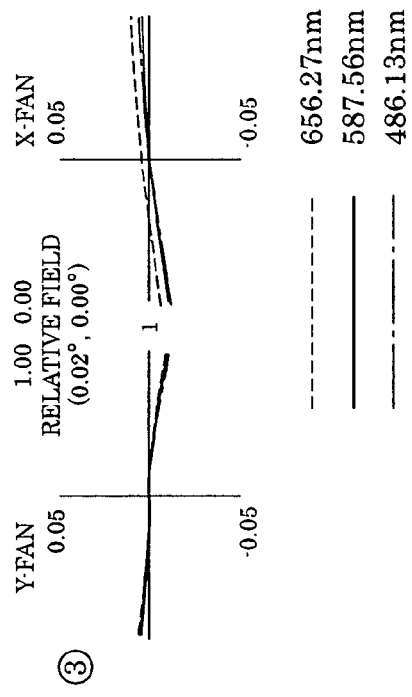

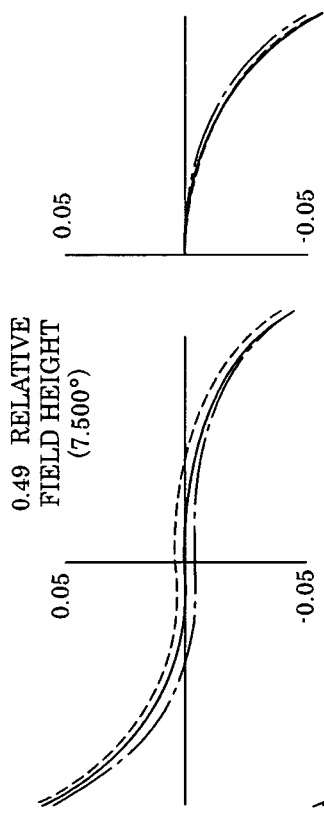
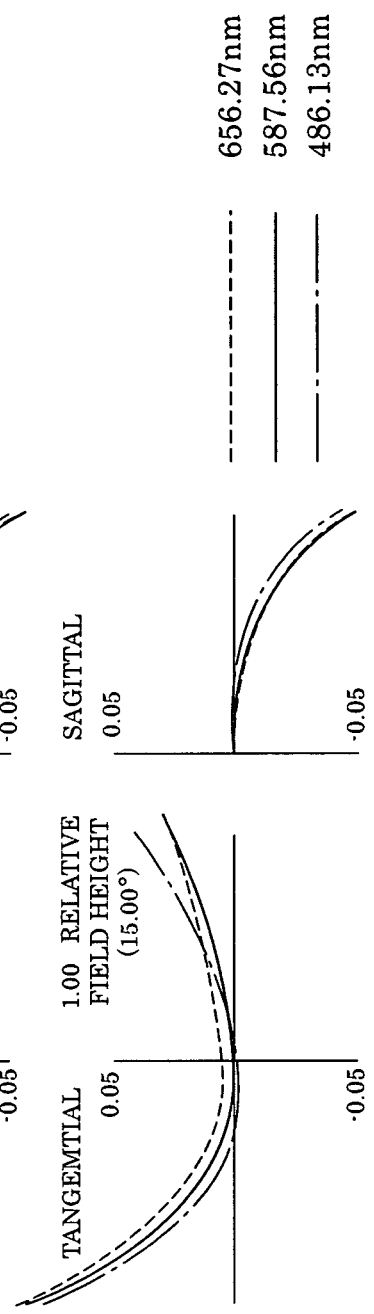
FIG. 14A
FIG. 14B
FIG. 14C

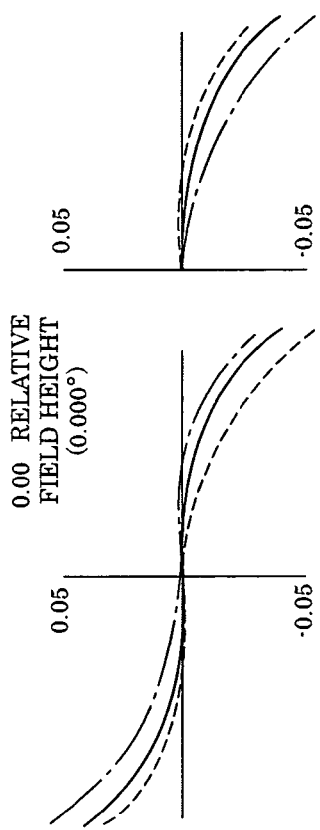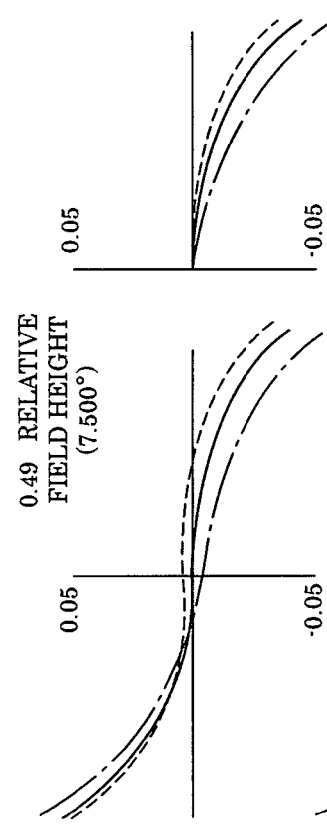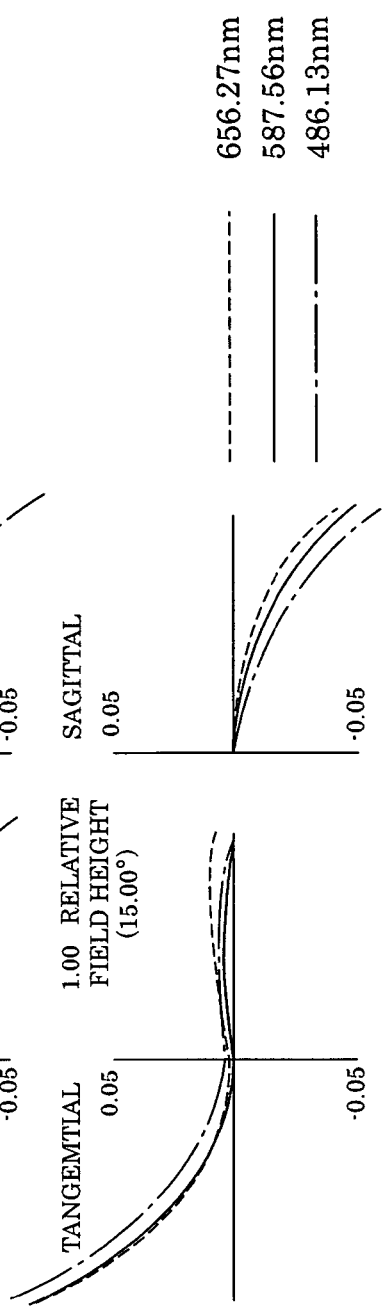
FIG. 17A
FIG. 17B
FIG. 17C

SCANNING DISPLAY OPTICAL SYSTEM

BACKGROUND OF THE INVENTION

1. Field of the Invention

The present invention relates to scanning display optical systems which form images by scanning a light beam, and more specifically relates to an optical system suitable for use in an electronic view finder mounted in an imaging apparatus, such as a digital still camera and a video camera, or in an image display apparatus, such as a head mount display.

2. Description of the Related Art

Image display apparatuses which directly form an image on a viewer's retina by scanning a light beam emitted from a light-source unit in two-dimensional directions are suggested. For example, U.S. Pat. No. 5,467,104 discloses a retina scanning display which focuses a light beam scanned in two-dimensional directions on a primary imaging surface and forms a two-dimensional image on a viewer's retina through an ocular optical unit (eyepiece). In this apparatus, light must be scanned at a very high speed, and accordingly a very small device is used in a scanning unit, such as a mirror, for scanning light. Therefore, the light beam which is scanned is very thin, and the diameter of the light beam at the viewer's pupil is very small.

In order to increase the exit pupil diameter, U.S. Pat. No. 5,701,132 discloses a method of increasing the divergence angle of a light beam by arranging a light-diffusing member, such as a lens array and a diffuser, on a curved intermediate imaging surface formed by a scanned light beam and causing the light beam to pass through the light-diffusing member.

On the other hand, Japanese Patent Laid-Open Nos. 2001-4955 (paragraphs 0239 to 0241, FIG. 20, etc.) and 2001-194617 (paragraphs 0087 to 0104, FIG. 2, etc.) suggest optical systems including prisms which have rotationally asymmetric surfaces and which are made of materials with a refractive index n of 1 or more. Since the prisms are used, the sizes of the optical systems can be reduced by bending optical paths and the optical path lengths can be increased by a factor of n (n>1) with respect to the actual transmission distance. However, in these optical systems, intermediate imaging surfaces are disposed in the prisms, and therefore the light-diffusing member disclosed in U.S. Pat. No. 5,701,132 cannot be used.

Japanese Patent Laid-Open No. 2004-45496 (paragraphs 0087 to 0104, FIG. 2, etc.) (corresponding to U.S. Patent Application No. 2004-141221) suggests an optical system including a prism filled with a medium with a refractive index of 1 or more as an optical unit for focusing scanned light on a scanning plane. In this optical system, an image formed on the scanning surface is viewed through an ocular optical unit including a diffusing plate disposed on the scanning surface.

A combined lens or a prism disclosed in Japanese Patent Laid-Open No. 2004-45496 may be used as an optical unit for focusing a light beam on an intermediate imaging surface. However, when light enters a medium having different dispersions, chromatic aberrations are generated, and accordingly the image quality is reduced. In order to correct the chromatic aberrations in this optical unit, an additional correction optical unit is required. Accordingly, the size of the overall optical system increases.

In addition, when the light beam from the light-source unit is incident on the scanning member at a large angle, so-called scanning distortion occurs in the image formed on the scanning surface.

In addition, in order to form a two-dimensional image on the viewer's retina, an ocular optical unit for making the viewer's pupil and the exit pupil substantially coincide with each other is placed behind the scanning surface. Visibility of a displayed image can be improved by moving the ocular optical unit along an optical axis of the ocular optical unit. However, when the light beam is incident on the scanning surface from a direction largely shifted from a direction perpendicular to the scanning surface, the size of the viewed image varies as the ocular optical unit moves.

In addition, in the case in which an optical system includes a light-source unit with one or more light sources and a light-source optical unit having a beam combiner which combines light beams from the light sources into a single light beam, a rotationally symmetric optical unit can be used as the light-source optical unit to obtain high accuracy. However, when a plurality of light sources are arranged along a line or a plane and light beams from the light sources are individually incident on the scanning member, it is difficult to obtain a small light-source optical unit having characteristics suitable for all of the light sources and including only rotationally symmetric optical components.

SUMMARY OF THE INVENTION

The present invention is directed to a small scanning display optical system which displays images with higher quality compared to a known structure.

According to one aspect of the present invention, a scanning display optical system includes a light-source unit configured to emit a light beam, a first optical unit which collects the light beam from the light-source unit, a scanning member which scans the light beam from the first optical unit, and a second optical unit which focuses the light beam scanned by the scanning member on a scanning surface. An optical axis defined by an optical path along which a light ray travels from the center of the scanning member to the center of the scanning surface via the second optical unit intersects itself. In addition, the second optical unit includes two reflective mirrors having positive optical powers.

According to another aspect of the present invention, a scanning display optical system includes a light-source unit configured to emit a light beam, a first optical unit which collects the light beam from the light-source unit, a scanning member which scans the light beam from the first optical unit, and a second optical unit which focuses the light beam scanned by the scanning member on about a scanning surface. An optical axis defined by an optical path along which a light ray travels from the center of the scanning member to the center of the scanning surface via the second optical unit intersects itself. The second optical unit includes two reflective mirrors, and the first optical unit includes an entrance surface, an exit surface, and two reflective surfaces, the surfaces surrounding an area filled with a medium with a refractive index of more than 1.

Further features and advantages of the present invention will become apparent from the following description of exemplary embodiments with reference to the attached drawings.

BRIEF DESCRIPTION OF THE DRAWINGS

FIG. 11 is a vertical sectional view of a scanning display optical system according to a sixth embodiment of the present invention.

FIGS. 12A and 12B are diagrams showing lateral aberrations on a scanning surface according to the first embodiment (Numerical Example 1).

FIGS. 13A and 13B are diagrams showing lateral aberrations on a scanning surface according to the second embodiment (Numerical Example 2).

FIGS. 14A to 14C are diagrams showing lateral aberrations on a scanning surface according to the third embodiment (Numerical Example 3).

FIGS. 17A to 17C are diagrams showing lateral aberrations on a scanning surface according to the sixth embodiment (Numerical Example 6).

DESCRIPTION OF THE EMBODIMENTS

Embodiments of the present invention will be described below with reference to the accompanying drawings.

First Embodiment

Figure 1:
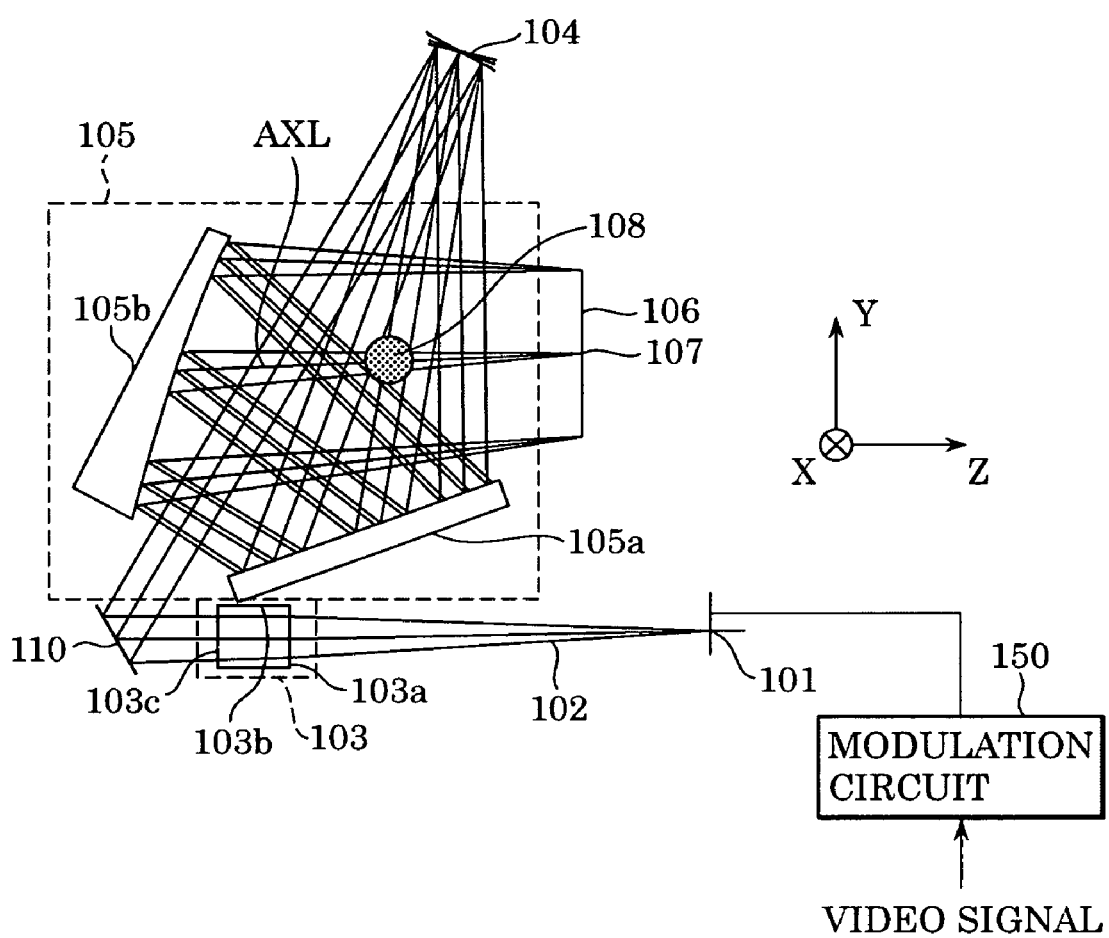
FIG. 1 is a vertical sectional view of a scanning display optical system according to a first embodiment of the present invention.

FIG. 1 is a vertical sectional view of a scanning display optical system included in an image display apparatus according to a first embodiment of the present invention. Numerical values corresponding to the present embodiment are presented below in Numerical Example 1.

In FIG. 1, a light-source unit 101 includes, for example, a laser diode (LD), a light-emitting diode (LED), an organic electroluminescent (EL) device, etc. Emission intensity of the light-source unit 101 is modulated by a modulation circuit 150 which receives an image signal. The image signal may be an imaging signal generated from an output from an imaging device (photoelectric transducer) which performs photoelectric conversion of an object image formed by an imaging optical system. Alternatively, the image signal may also be a video signal input from an image information supply device such as a personal computer, a DVD player, a video recorder, etc.

A light beam (divergent light beam) 102 emitted from the light-source unit 101 is collected, that is, collimated into a substantially parallel beam by a light-source optical unit (first optical unit) 103. Then, the light beam 102 is reflected by a mirror 110, which is the last surface of the light-source optical unit 103, and reaches a scanning unit 104. The light-source optical unit 103 includes a plurality of refractive surfaces. In FIG. 1, these refractive surfaces are denoted by the same reference numerals as those used in Numerical Example 1, which will be described below.

The light beam 102 is scanned in two-dimensional directions and enters a scanning optical unit (second optical unit) 105. The scanning optical unit 105 includes two surface reflective mirrors 105a and 105b having positive optical powers (optical power=reciprocal of focal length).

After the light beam 102 enters the scanning optical unit 105, the light beam 102 is reflected by the surface reflective mirrors 105a and 105b, which are arranged in that order in a travel direction of the light beam 102 from the scanning unit, and is focused on about a scanning surface 106 to form a spot 107.

The light beam 102 is scanned by the scanning unit 104, so that the spot 107 moves in the two-dimensional directions on the scanning surface 106 and forms a two-dimensional image on the scanning surface 106 in accordance with the intensity modulation of the light-source unit 101.

Figure 2A:
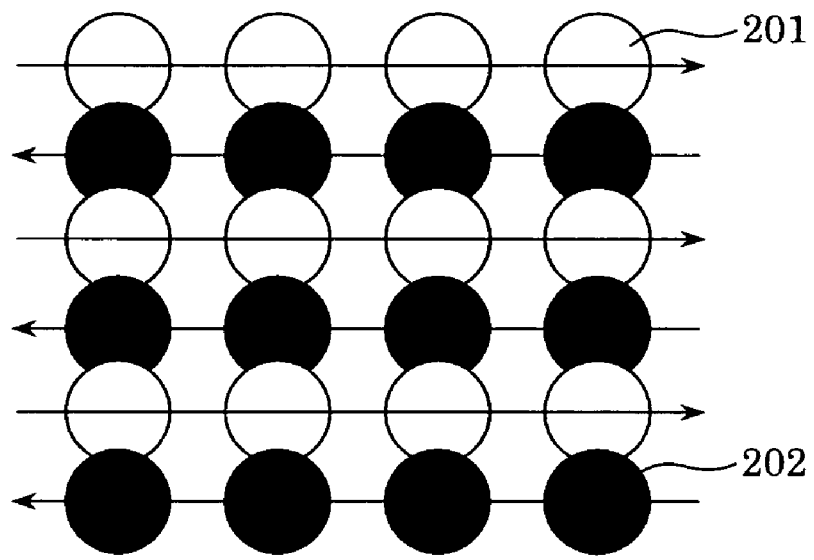
FIGS. 2A and 2B are diagrams showing the manner in which an image is formed according to the first embodiment.
Figure 2B:
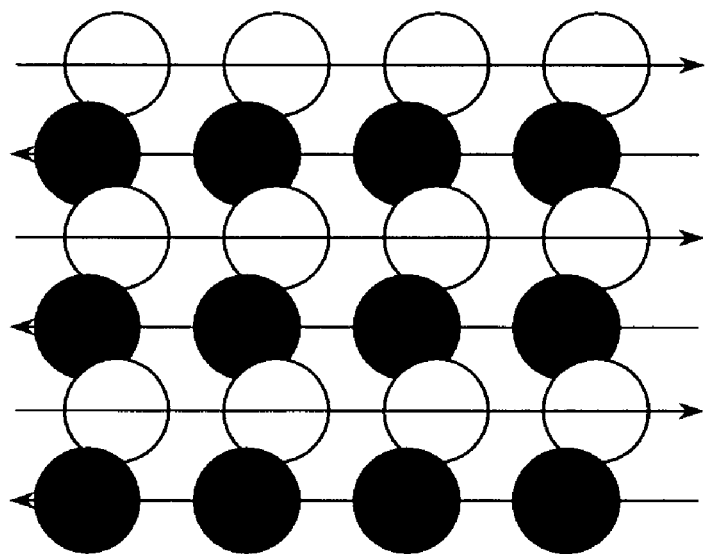

An image-forming process performed by the scanning display optical system according to the present embodiment will be described below with reference to FIGS. 2A and 2B. FIGS. 2A and 2B show the movement of the spot 107 on the scanning surface 106. A two-dimensional image is formed by raster scanning in which the spot 107 moves horizontally at a high speed and vertically at a low speed on the scanning surface 106. The image is formed not only while the spot 107 is moved from left to right in FIG. 2A (forward scanning 201) but also while the spot 107 is moved from left to right (backward scanning 202). In the case in which both forward and backward scanning are performed, if a print start position of lines drawn from right to left and that of lines drawn from left to right are shifted with respect to each other, an image drawn by the forward scanning 201 and that drawn by the backward scanning 202 would be shifted from each other, as shown in FIG. 2B.

Therefore, according to the present embodiment, in order to prevent the images drawn in forward and backward scanning from being shifted from each other, a photodetector 108 is provided to detect the time at which the spot 107 passes through a predetermined position.

In FIG. 1, a part of the light beam which travels from the surface reflective mirror 105a to the scanning surface 106 is reflected frontward in the direction perpendicular to the page by a mirror (not shown) and enters the photodetector 108. The photodetector 108 and the scanning surface 106 are disposed at optically equivalent positions so that the part of the light beam is focused on the photodetector 108 to form a spot. Accordingly, resolution of the photodetector 108 is increased.

Characteristics of the present invention will be described below.

I. The scanning optical unit 105 includes only surface reflective mirrors having no optically transmissive surface.

Therefore, the scanning optical unit 105 causes no chromatic aberration, and the image quality can be increased compared to the case in which optical components, such as prisms, having optically transmissive surfaces are used.

II. The two surface reflective mirrors 105a and 105b are composed of rotationally asymmetric surfaces having no axis of rotational symmetry. Since the asymmetric surfaces are used, eccentric (decentration) aberrations caused when the reflective mirrors are arranged at an angle with respect to the light beam can be reduced.

III. The light beam 102 from the light-source optical unit 103 travels through the space between the two reflective mirrors 105a and 105b before reaching the scanning unit 104. Accordingly, the incidence angle of the light beam 102 on the scanning unit 104 can be reduced to about 10°, and scanning distortion caused when the light beam 102 is incident on the scanning unit 104 at an angle can be reduced.

IV. When a reference axis AXL is an optical path of a light ray (reference ray) which passes through the center of the scanning unit 104 (center of the deflecting surface for scanning the light beam) and reaches the center of the scanning surface 106, L1 is a distance between the scanning unit 104 and the reflective mirror 105a along the reference axis AXL, and L2 is a distance between the reflective mirror 105b and the scanning surface 106 along the reference axis AXL, the two surface reflective mirrors 105a and 105b can be positioned so as to satisfy the following expression:

$$0.6 < L1/L2 < 1.5 \tag{1}$$

Expression (1) limits the ratio between the distances between the surfaces along the reference axis AXL. When the ratio is reduced to below the lower limit in Expression (1), the dimension along the direction perpendicular to the scanning surface 106 increases. Accordingly, the size of the overall optical system increases. In addition, when the ratio is reduced to below the lower limit, the principal plane between the reflective surfaces approaches one of the two reflective surfaces. Accordingly, it becomes difficult to correct the eccentric aberrations. In addition, when the ratio is increased to above the upper limit, the distance between the surface reflective mirror 105b and the scanning surface 106 is relatively reduced and therefore the surface reflective mirror 105b and the scanning unit 104 physically interfere with the optical path.

In the present embodiment (Numerical Example 1), L1/L2 is set to about 1.21, which satisfies Expression (1). In addition, L1 is longer than L2.

V. The reference axis AXL intersects itself once while it extends from the scanning unit 104 to the scanning surface 106. More specifically, a portion of the reference axis AXL which extends from the scanning unit 104 to the surface reflective mirror 105a intersects a portion of the reference axis AXL which extends from the surface reflective mirror 105b to the scanning surface 106. Since the reference axis AXL intersects itself, the incidence angles of the light beam on the surface reflective mirrors 105a and 105b can be reduced, and the aberrations caused when the light beam is reflected by the surface reflective mirrors 105a and 105b can be reduced.

VI. At least one of the two reflective mirrors 105a and 105b is eccentric with respect to the reference axis AXL. In the scanning optical unit 105, a plane in which the surface reflective mirrors 105a and 105b are eccentric is defined as an YZ plane, and a plane in which they are not eccentric is defined as an XZ plane. In addition, $\phi_{M1}$ and $\rho_{M1}$ are local radii of curvature of the surface reflective mirror 105a in the XZ and YZ planes, respectively, at the reference axis AXL, and $\phi_{M2}$ and $\rho_{M2}$ are local radii of curvature of the surface reflective mirror 105b in the XZ and YZ planes, respectively, at the reference axis AXL.

The ratios $\phi_{M1}/\phi_{M2}$ and $\rho_{M1}/\rho_{M2}$ between the radii of curvature of the surface reflective mirrors 105a and 105b can be set to satisfy the following expressions:

$$0.8 < \phi_{M1}/\phi_{M2} < 3 \tag{2}$$

$$0.8 < \rho_{M1}/\rho_{M2} < 3 \tag{3}$$

When the ratios are increased to above the upper limit in Expressions (2) and (3), the eccentric aberrations cannot be sufficiently corrected. When the ratios are reduced to below the lower limit, the incidence angle of the light beam on the scanning surface 106 increases, and telecentricity cannot be maintained.

In the present embodiment (Numerical Example 1), $\phi_{M1}/\phi_{M2}$ and $\rho_{M1}/\rho_{M2}$ are set to about 1.91 and 2.24, respectively, which satisfy Expressions (2) and (3).

Since the two reflective mirrors having positive optical powers are used, the scanning optical unit 105 functions as a substantially telecentric optical system. In other words, a substantially parallel beam is incident on the scanning surface 106. Although not shown in FIG. 1, an ocular optical unit for directing the light beam from the scanning surface 106 to the viewer's eye is disposed behind the scanning surface 106 (that is, at a position opposite to the scanning optical unit 105 across the scanning surface 106). Since the scanning optical unit 105 is substantially telecentric, variations in an image size can be reduced when the ocular optical unit is moved along an optical axis of the ocular optical unit to adjust visibility. In addition, variations in distortion can also be reduced. In addition, when the optical powers of the two reflective mirrors are close to each other, the optical power required in the scanning optical unit 105 can be distributed and the aberrations can be suppressed.

Other embodiments, which will be described below, also have the above-described characteristics I to VI.

Although only one light source is shown in the present embodiment, a light-source unit including, for example, three light sources for respectively emitting red, green, and blue light instead of a single light source for a single color may also be used. In such a case, the red, green, and blue light with different wavelengths emitted from the respective light sources are combined into a single light beam by an optical element, such as a dichroic prism, and the combined light beam is incident on the scanning unit 104. The light sources of different colors are modulated in accordance with respective image signals, and accordingly a color image is presented to the viewer. Although the emission intensity of the light source unit is modulated in accordance with the image signal by the modulation circuit in the present embodiment, a pulse width modulator (PWM) or an external modulator may also be used.

Figure 3:
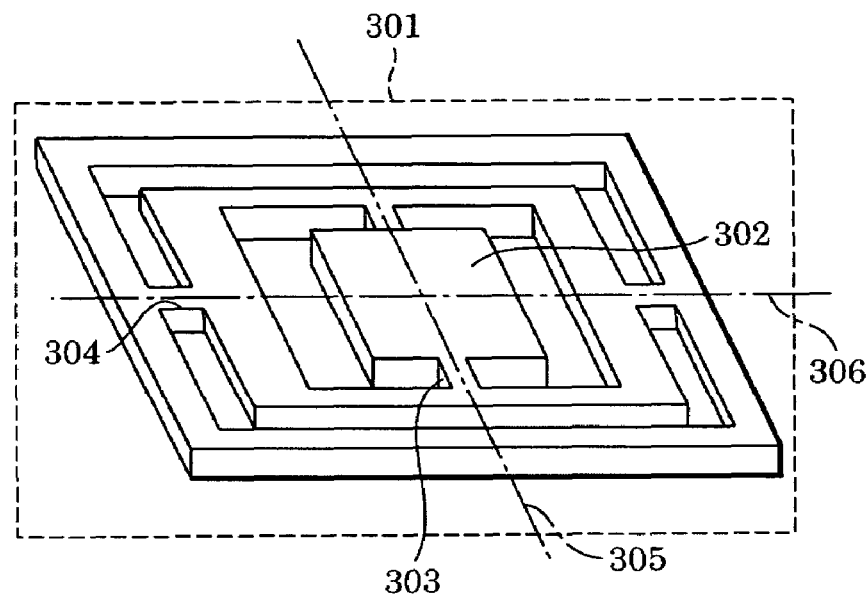
FIG. 3 is a diagram showing an example of a scanning unit according to the first embodiment.

In the present embodiment, a single device capable of two-dimensional scanning is used as the scanning unit 104. FIG. 3 shows an example of a scanning unit.

FIG. 3 shows a micro-electro-mechanical system (MEMS) device 301 obtained by semiconductor processing. The device 301 includes a small mirror 302 having a deflecting surface which functions as a reflective surface and torsion bars 303 and 304 which retain the small mirror 302. The small mirror 302 reciprocates around an axis 305 as the torsion bars 303 twist, and reciprocates around an axis 306 as the torsion bars 304 twist. At least one of the reciprocating motions around the axes 305 and 306 is a resonant motion caused by a driving circuit (not shown).

Due to these reciprocating motions, the normal direction of the deflecting surface 302 varies two dimensionally while a light beam is reflected off the deflecting surface 302, and two-dimensional scanning of the light beam is performed accordingly. The MEMS device 301 is also used as the scanning unit in other embodiments.

Since this MEMS device is used, the size of the scanning unit 104 is reduced. However, the scanning unit 104 may, of course, also be obtained by combining one-dimensional rotating polygons or two one-dimensional MEMS scanning devices having scanning directions which are perpendicular to each other.

Image distortion, such as unevenness, caused by variation in scan speed of the resonance device can be eliminated by electrically correcting the modulation of the light-source unit 101. Similarly, the image distortion caused by the resonance device is also electrically corrected in other embodiments.

In the present embodiment, the light beam scanned by the scanning unit is focused on about the scanning surface by the scanning optical unit composed of two reflective mirrors so as to bend the optical path. Accordingly, a small image display device which displays high quality images is provided.

Second Embodiment

Figure 4:
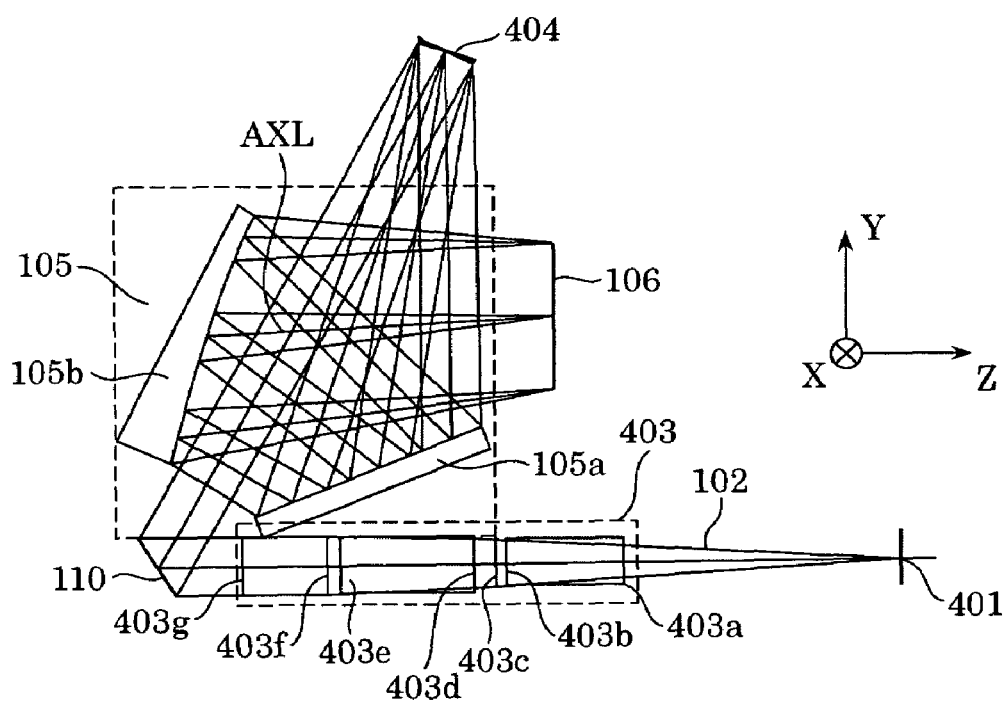
FIG. 4 is a vertical sectional view of a scanning display optical system according to a second embodiment of the present invention.

FIG. 4 is a vertical sectional view showing the structure of a scanning display optical system according to a second embodiment of the present invention. In the second embodiment, components having functions similar to those in the first embodiment are denoted by the same reference numerals, and explanations thereof are thus omitted.

Figure 5:
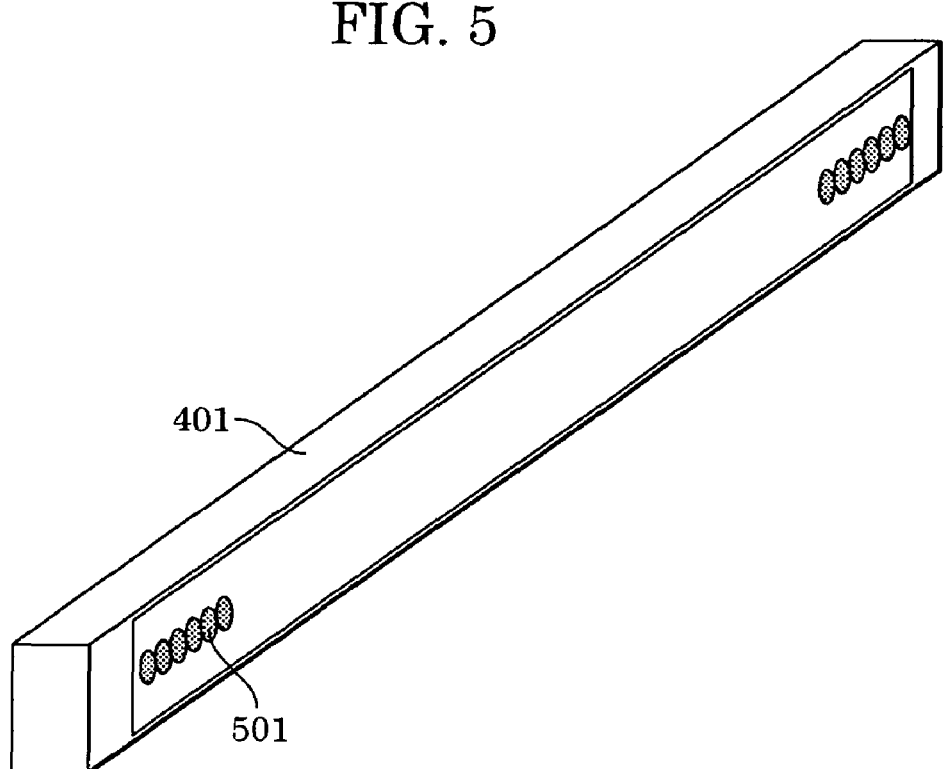
FIG. 5 is a schematic diagram showing a bar-array light-source unit according to the second embodiment.

In the present embodiment, a light-source unit 401 includes multiple linearly arranged light emitters. The number of light emitters is the same as the number of pixels along a direction perpendicular to the scanning direction on the scanning surface. As shown in FIG. 5, the light-source unit 401 is a bar-array light-source unit in which low-power laser diodes (LDs) are arranged linearly. The same number of LDs 501 as the number of pixels arranged horizontally, that is, 800 LDs in the case in which images are formed with an SVGA resolution (800×600 pixels), are arranged linearly in the light-source unit 401.

A light beam (divergent light beam) 102 is emitted from each of the LDs 501 and is collected (collimated) into a substantially parallel beam by a light-source optical unit 403. Then, the thus obtained substantially parallel beams are reflected by a mirror 110, which is the last surface of the light-source optical unit 403, and form pupils on a scanning unit 404. In FIG. 4, refractive surfaces included in the light-source optical unit 403 are denoted by the same reference numerals as those used in Numerical Example 2, which will be described below.

The scanning unit 404 scans the light beams 102 only in one-dimensional direction (along the page in FIG. 4). As the scanning unit 404 performs one-dimensional scanning, spot lines which extend horizontally are formed on a scanning surface 106. Each LD 501 in the light-source unit 401 is modulated in accordance with the position of the spot line, and accordingly a two-dimensional image is formed on the scanning surface 106.

Although the image is displayed with the SVGA resolution in the present embodiment, the image resolution is not limited to this. For example, the image may also be displayed with an aspect ratio of 4:3, such as VGA resolution (640×480 pixels) and XGA resolution (1024×768 pixels) or with an aspect ratio of 16:9, such as a resolution of 1920×1080 pixels used in HDTV and the like. Thus, images with various resolutions and aspect ratios can be displayed.

In addition, although the LDs are used as light sources in FIG. 5, other light sources, such as light-emitting diodes (LEDs) and organic electroluminescent (EL) devices, having small light emitters may also be used.

In addition, although the light source array shown in FIG. 5 is described as a single-color light source array in the present embodiment, a color image may also be formed by arranging light sources for a plurality of colors which emit light beams with different wavelengths corresponding to the pixels.

Figure 6:
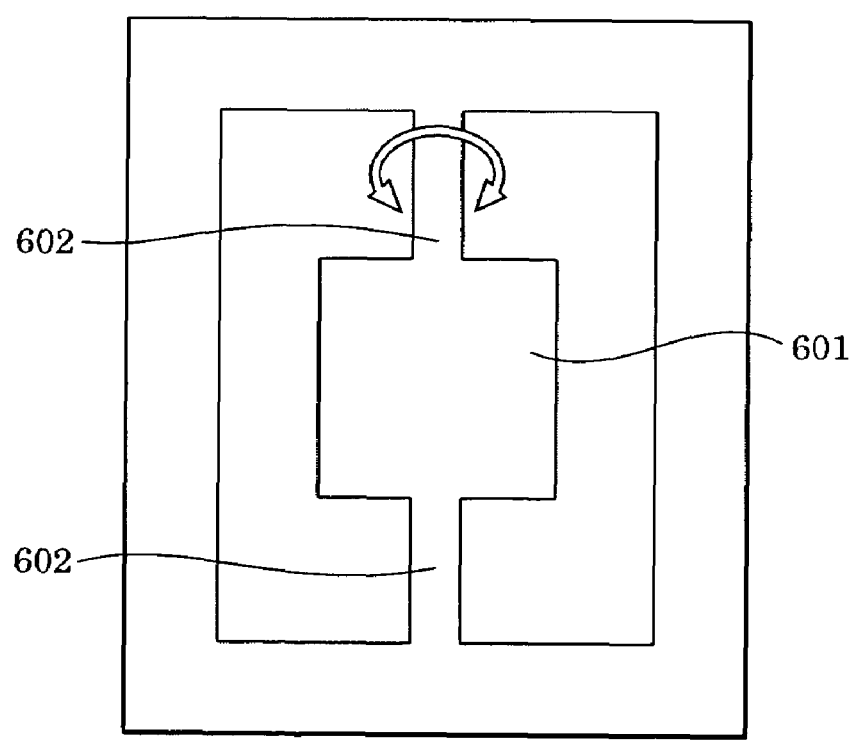
FIG. 6 is a diagram showing an example of a one-dimensional scanning unit according to the second embodiment.

In the present embodiment, the scanning unit described in the first embodiment which performs two-dimensional scanning is not necessary since the scanning unit 404 only performs one-dimensional scanning. Accordingly, a MEMS scanning device shown in FIG. 6 or a galvanometer may be used as the scanning unit. The MEMS scanning device shown in FIG. 6 includes a deflecting surface 601 which reciprocates as torsion bars 602 twist. Accordingly, one-dimensional scanning is performed.

Third Embodiment

Figure 7:
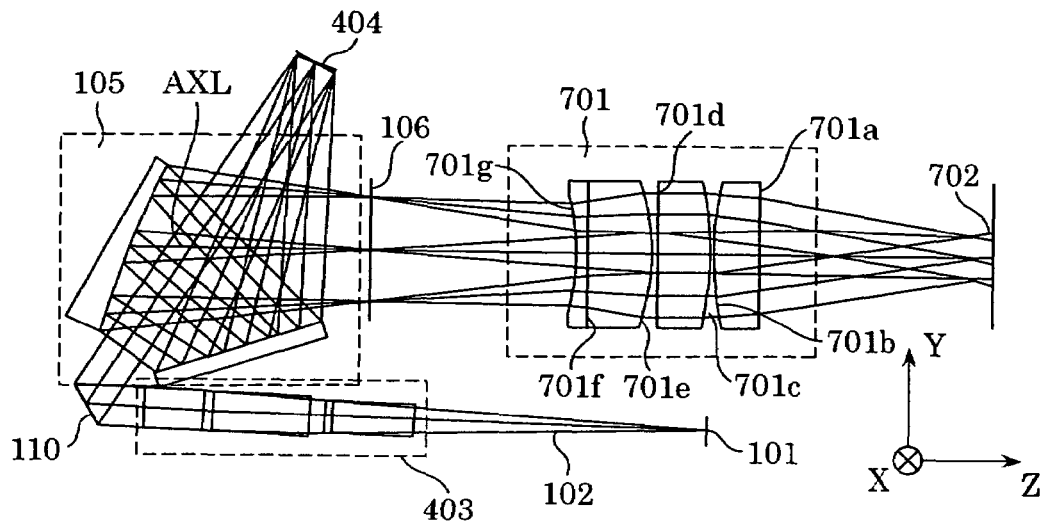
FIG. 7 is a vertical sectional view of a scanning display optical system according to a third embodiment of the present invention.

FIG. 7 is a vertical sectional view showing the structure of a scanning display optical system according to a third embodiment of the present invention. In the present embodiment, an ocular optical unit 701 is added to the display optical system according to the second embodiment at a position opposite to the scanning optical unit 105 across the scanning surface 106. In FIG. 7, refractive surfaces included in the ocular optical unit 701 are denoted by the same reference numerals as those used in Numerical Example 3, which will be described below.

A viewer places an eye (pupil) near an exit pupil 702 of the ocular optical unit 701, so that an enlarged view of an areal image formed on the scanning surface 106 can be observed as a virtual image.

In systems like the display optical system according to the present embodiment, small mirrors are generally used as a scanning unit 404 in order to reduce the overall size. However, when small mirrors are used, the diameter of the scanned beam is reduced, and accordingly the exit pupil diameter is also reduced. Therefore, it becomes difficult for the viewer to place the eye (pupil) at the position of the exit pupil. Accordingly, although not shown in the figure, an optical component having a light-diffusing function which increases the divergence angle of the output light beam with respect to the convergence angle of the incident light beam may be placed on about the scanning surface 106. In such a case, the exit pupil diameter is increased and the viewer can easily view the image.

Since the ocular optical unit 701 is placed behind the scanning surface 106 (to face the viewer's eye), the viewer can observe an enlarged view of the two-dimensional image formed on the scanning surface 106 as an areal image.

Fourth Embodiment

Figure 8:
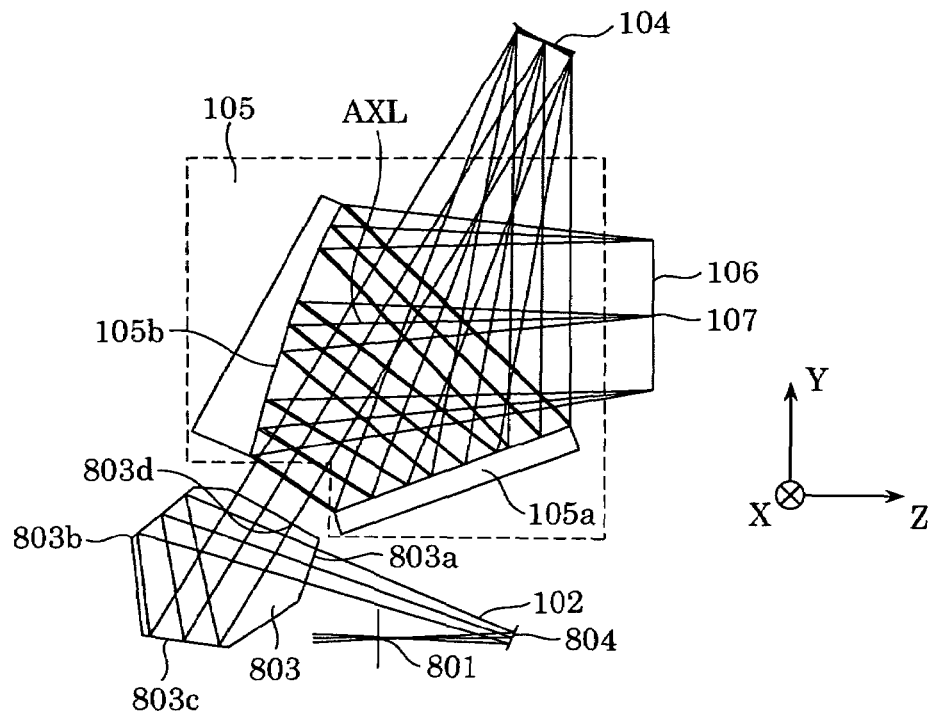
FIG. 8 is a vertical sectional view of a scanning display optical system according to a fourth embodiment of the present invention.

FIG. 8 is a vertical sectional view showing the structure of a scanning display optical system according to a fourth embodiment of the present invention. The fourth embodiment is similar to the first embodiment except for the light-source optical unit. In the fourth embodiment, components having functions similar to those in the first embodiment are denoted by the same reference numerals, and explanations thereof are thus omitted.

According to the present embodiment, a light-source optical unit 803 includes four optical surfaces consisting of an entrance surface 803a, a first reflective surface 803b, a second reflective surface 803c, and an exit surface 803d, in that order in a travel direction of a light beam from a light-source unit 801. A space surrounded by these optical surfaces is defined by a prism (transparent element) filled with a medium with a refractive index of more than 1. A mirror 804 for guiding the light beam 102 from the light-source unit 801 towards the entrance surface 803a of the light-source optical unit 803 is disposed between the light-source unit 801 and the light-source optical unit 803. The mirror 804 bends the optical path from the light-source unit 801 to the light-source optical unit 803 so that the size of the system including the light-source unit 801 and the light-source optical unit 803 can be reduced.

The entrance surface 803a of the light-source optical unit 803 (prism) has a radius of curvature which is concentric with the light-source unit 801, and the exit surface 803d is flat. In addition, the first and second reflective surfaces 803b and 803c provide major optical power in the light-source optical unit 803. The light beam 102 from the light-source unit 801 is collected (collimated) into a substantially parallel beam by the optical powers of the entrance surface 803a and the reflective surfaces 803b and 803c, and the obtained substantially parallel beam is incident on the scanning unit 104.

The first reflective surface 803b is an anamorphic surface having different curvatures between XY and XZ sections, and accordingly the eccentric aberrations caused when the optical surface is disposed at an angle with respect to the incident light beam are corrected.

The light-source unit 801 shown in FIG. 8 includes a single light source. However, an optical element, such as a dichroic prism, for combining light beams with different wavelengths emitted from respective light sources may also be disposed between the light-source unit 801 and the light-source optical unit 803. In such a case, a color image may be obtained by combining red, green, and blue light with different wavelengths emitted from the respective light sources into a single light beam and directing the combined light beam to the scanning unit 104.

In the present embodiment, since a prism is used as the light-source optical unit, the optical path in the light-source optical unit is bent and the size of the light-source optical unit is reduced.

At least one of the two reflective surfaces 803b and 803c in the light-source optical unit 803 may be composed of a rotationally asymmetric surface having no axis of rotational symmetry. In such a case, eccentric aberrations caused when the optical path is bent can be reduced.

When the light-source optical unit 803 is composed of a single prism, the number of components for obtaining two reflective surfaces is reduced. Accordingly, assembly and arrangement of the two reflective surfaces are easy.

Fifth Embodiment

Figure 9:
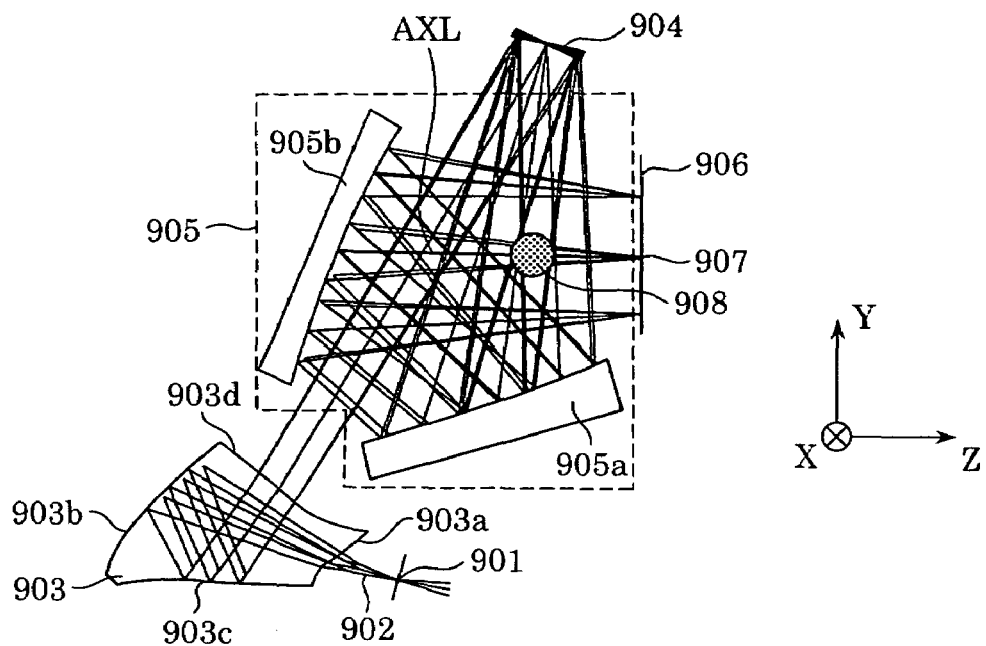
FIG. 9 is a vertical sectional view of a scanning display optical system according to a fifth embodiment of the present invention.

FIG. 9 is a vertical sectional view showing the structure of a scanning display optical system according to a fifth embodiment of the present invention. The present embodiment is a modification of the fourth embodiment, and no mirror is provided between a light-source unit and a light-source optical unit.

Similar to the fourth embodiment, a light-source optical unit 903 includes four optical surfaces consisting of an entrance surface 903a, a first reflective surface 903b, a second reflective surface 903c, and an exit surface 903d, in that order in a travel direction of a light beam 902 from a light-source unit 901. A space surrounded by these optical surfaces is defined by a prism filled with a medium with a refractive index of more than 1. Also in the present embodiment, the first and second reflective surfaces 903b and 903c provide major optical power. However, in the present embodiment, all of the four surfaces of the prism are rotationally asymmetric surfaces having no axis of rotational symmetry. Accordingly, the eccentric aberrations caused when the optical surface is disposed at an angle with respect to the light beam 902 are corrected.

In FIG. 9, emission intensity of the light source unit 901 is modulated by a modulation circuit described above in the first embodiment. The light beam 902 emitted from the light source unit 901 is collected (collimated) into a substantially parallel beam by the light-source optical unit 903, and reaches a scanning unit 904. The light beam 902 incident on the scanning unit 904 is scanned in two-dimensional directions, and is guided into the scanning optical unit 905.

The scanning optical unit 905 includes two surface reflective mirrors 905a and 905b having positive optical powers. After the light beam 902 enters the scanning optical unit 905, it is reflected by the surface reflective mirrors 905a and 905b, in that order, and is focused on about a scanning surface 906 to form a spot 907.

The light beam 902 is scanned by the scanning unit 904, so that the spot 907 moves in the two-dimensional directions on the scanning surface 906 and forms a two-dimensional image on the scanning surface 906 in accordance with the intensity modulation of the light-source unit 901. In addition, a photodetector 908 similar to that described in the first embodiment is provided.

Both of the surface reflective mirrors 905a and 905b have rotationally asymmetric surfaces and positive optical powers. Accordingly, eccentric aberrations caused when the surface reflective mirrors are arranged at an angle with respect to the incident light beam are corrected.

In the present embodiment, the two surface reflective mirrors 905a and 905b are positioned so as to satisfy L1=20.54 and L2=17.13. Accordingly, L1/L2 is 1.20, which satisfies Expression (1). In addition, L1 is longer than L2.

When $\phi_{M1}$ and $\rho_{M1}$ are local radii of curvature of the surface reflective mirror 905a in the XZ and YZ planes, respectively, at the reference axis AXL and $\phi_{M2}$ and $\rho_{M2}$ are local radii of curvature of the surface reflective mirror 905b in the XZ and YZ planes, respectively, at the reference axis AXL, the ratios $\phi_{M1}/\phi_{M2}$ and $\rho_{M1}/\rho_{M2}$ between the radii of curvature of the surface reflective mirrors 905a and 905b are set as follows:

$$\phi_{M1}/\phi_{M2}=1.38$$

$$\rho_{M1}/\rho_{M2}=1.31$$

Accordingly, Expressions (2) and (3) are satisfied. The light beam 902 from the light-source optical unit 903 travels through the space between the two reflective mirrors 905a and 905b before reaching the scanning unit 904. Accordingly, the incidence angle of the light beam 902 on the scanning unit 904 is reduced to 11.6°, and scanning distortion caused when the light beam 902 is incident on the scanning unit 904 at an angle can be reduced.

Since the two reflective mirrors having positive optical powers are used, the scanning optical unit 905 functions as a substantially telecentric optical system. Since the scanning optical unit 905 is substantially telecentric, in the case in which an ocular optical unit (not shown) is disposed behind the scanning surface 906, variation in an image size can be reduced when the ocular optical unit is moved along an optical axis of the ocular optical unit to adjust visibility. In addition, variations in distortion can also be reduced. In addition, when the optical powers of the two reflective mirrors are close to each other, the optical power required in the scanning optical unit 905 can be distributed and the aberrations can be suppressed.

In addition, in the present embodiment, an array light-source unit including light emitters arranged discretely is used as the light source unit 901. A method for forming a scan image using a light-source unit having a plurality of light emitters is disclosed in, for example, U.S. Pat. No. 6,362,912.

Figure 18:
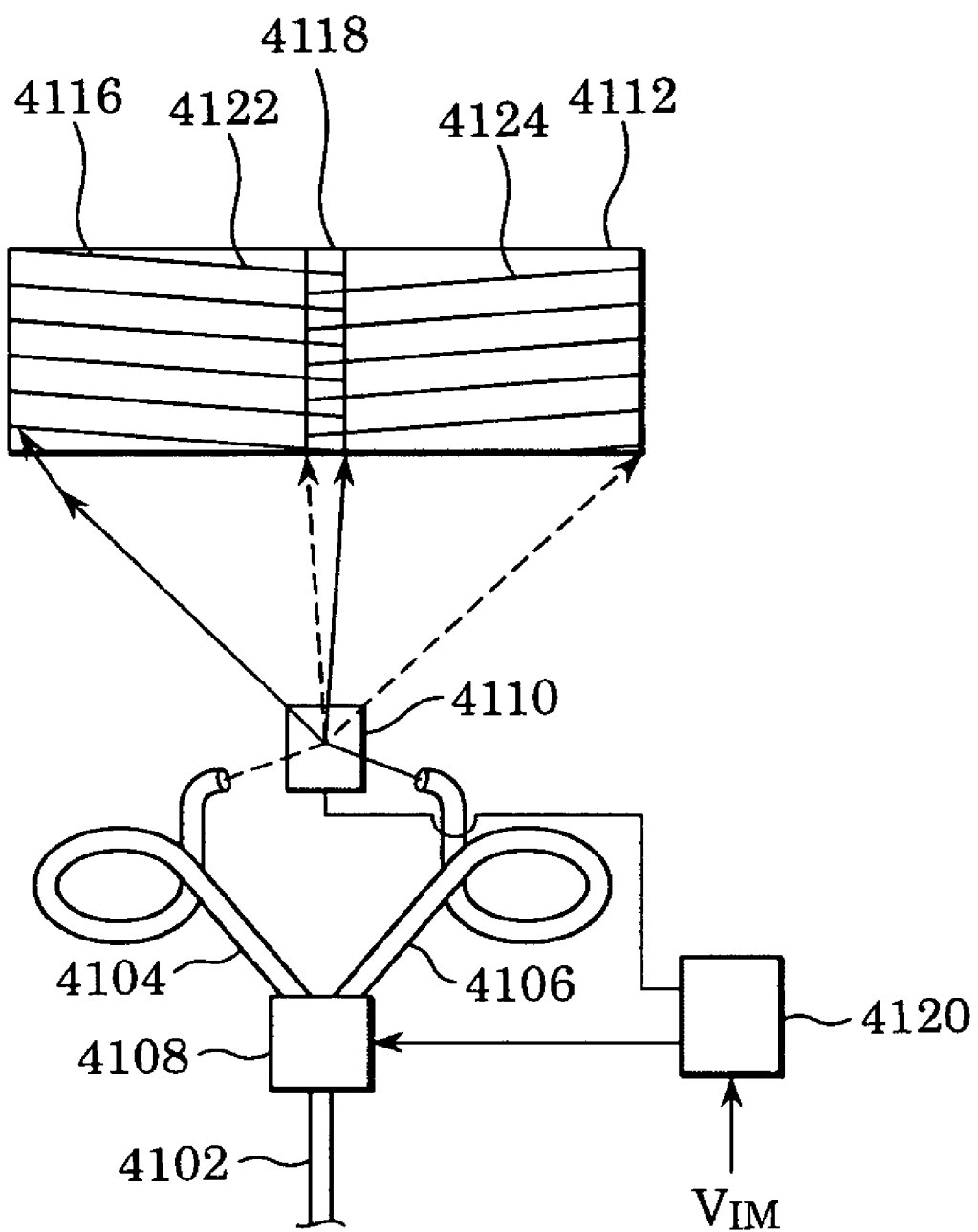
FIG. 18 is a diagram showing a known scanning display optical system including a plurality of light sources.

FIG. 18 shows a structure described in the above-mentioned patent. According to this structure, light beams emitted from ends of two or four fibers are scanned, and drawing areas corresponding to the light beams are connected to each other on a scanning surface to obtain a single san image.

With reference to FIG. 18, two fibers 4104 and 4106 are provided as light sources, and light beams emitted from the respective light sources are scanned by a scanning unit 4110 to form images in two areas 4112 and 4122 on an image plane.

As described on line 47 in column 25 of the above-mentioned patent, image data may be electrically corrected to make an overlap area 4118 between the two areas indiscernible. A drawing method applied in the case in which the array light-source unit of this structure is used will be described below with reference to FIG. 10.

Figure 10:
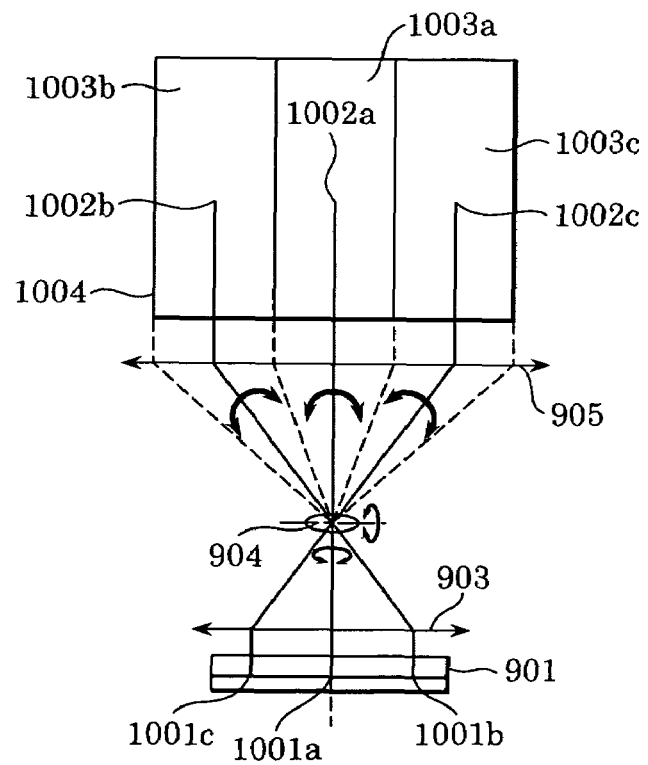
FIG. 10 is a diagram showing a manner in which a two-dimensional image is generated using discrete array optical elements according to the fifth embodiment.

In the present embodiment, an array light-source unit including three light emitters is used. For simplicity, only principal rays of light beams emitted from the light emitters are shown in FIG. 10. In addition, each of the light-source optical unit 903 and the scanning optical unit 905 is shown as a single optical element.

The light beams emitted from the three light emitters 1001a to 1001c are collimated into substantially parallel light beams by the light-source optical unit 903, and are focused on the scanning unit 904. The focused light beams are scanned in two-dimensional directions by the scanning unit 904, and are then focused on the scanning surface 906 by the scanning optical unit 905.

At this time, spots 1002a to 1002c on the scanning surface 906 corresponding to the light emitters 1001a to 1001c, respectively, are moved in areas 1003a to 1003c, respectively, by the scanning operation of the scanning unit 904. Accordingly, three rectangular images are obtained, and a two-dimensional image is formed on a single screen 1004 by connecting the three rectangular images. Electrical correction is performed so that overlap areas between the rectangular images are made indiscernible.

Although three light emitters are provided in the present embodiment, the number of light emitters is not limited to three, and may be determined arbitrarily. For example, when the number of light emitters is the same as the number of pixels arranged horizontally, an operation similar to one-dimensional scanning described in the second embodiment is performed.

In addition, a color image may be displayed by arranging light sources with wavelengths of red, green, and blue at positions corresponding to the light emitters and mixing the colors on the scanning surface.

The light sources may be LDs, LEDs, and organic EL devices having small light emitters.

In the case in which a light-source unit including a plurality of linearly arranged light emitters is used, a plurality of lenses must be provided, as shown in the second embodiment, to obtain a light-source optical unit including only rotationally symmetric optical components. In comparison, the light-source optical unit according to the present embodiment includes a prism having a plurality of rotationally asymmetric surfaces. Accordingly, the light-source optical unit for simultaneously processing light beams from a plurality of light sources is composed of a single component, and therefore the light-source optical unit can be easily assembled.

Since the scanning optical unit including two surface reflective mirrors having positive optical powers is used, a small, telecentric scanning display optical system, which is free from chromatic aberrations, can be obtained.

In the present embodiment, since a prism is used as the light-source optical unit, the optical path in the light-source optical unit is bent and the size of the light-source optical unit is reduced.

Sixth Embodiment

FIG. 11 is a vertical sectional view showing the structure of a scanning display optical system according to a sixth embodiment of the present invention. In the present embodiment, an ocular optical unit 1102 is added to the display optical system according to the fifth embodiment at a position opposite to the scanning optical unit 905 across the scanning surface 906. In FIG. 11, refractive surfaces included in the ocular optical unit 1102 are denoted by the same reference numerals as those used in Numerical Example 6, which will be described below.

In the present embodiment, a two-dimensional image (areal image) on the scanning surface 906 is focused at the position of an exit pupil 1103 by the ocular optical unit 1102. The viewer places an eye (pupil) on about the exit pupil 1103, so at an enlarged view of the two-dimensional image on the scanning surface 906 can be observed as a virtual image. In the present embodiment, similar to the third embodiment, a light-diffusing member 1101 is disposed on about the scanning surface 906 to increase visibility. However, the light-diffusing member may also be omitted.

NUMERICAL EXAMPLES

Next, Numerical Examples 1 to 6 (Tables 1 to 6) corresponding to first to sixth embodiments, respectively, will be described. In each numerical example, the position of the light-source unit is used as a reference of an absolute coordinate system.

Three-dimensional coordinate axes Z, Y, and X of the absolute coordinate system are defined as follows:

Z axis extends in a direction from the center of the $0^{th}$ surface to the center of the first surface (an origin of the absolute coordinate system), the direction being defined as positive;

Y axis extends through the center of the first surface (the origin of the absolute coordinate system), and is rotated counterclockwise by 90° with respect to the Z axis; and X axis extends through the origin, and is perpendicular to the Z and Y axes.

The shape of the $i^{th}$ surface in the optical system is expressed by a function based on a local coordinate system. A tilt angle of the $i^{th}$ surface in the YZ plane is expressed by an angle θgi (degrees) with respect to the Z axis of the absolute coordinate system, the counterclockwise direction being defined as positive. In the embodiments, the tilt angle is set only in the YZ plane. In the local coordinate system (x, y, z) of the $i_{th}$ surface, the y and z axes are disposed on the YZ plane of the absolute coordinate system, and is inclined by the angle θgi in the YZ plane. The coordinate axes z, y, and x of the local coordinate system are defined as follows:

z axis extends through the origin of the local coordinate system, and is inclined counterclockwise by θi with respect to the Z axis of the absolute coordinate system in the YZ plane;

y axis extends through the origin of the local coordinate system, and is rotated counterclockwise by 90° with respect to the z axis in the YZ plane; and x axis extends through the origin of the local coordinate system, and is perpendicular to the z and y axes.

In each numerical example, Ndi and vdi show the refractive index and the Abbe number, respectively, of d line between the $i^{th}$ and $(i+1)^{th}$ surfaces.

The shape of rotationally asymmetric surfaces having no axis of rotational symmetry is expressed as follows:

$$z = \frac{cr^2}{1+\sqrt{1-(1+k)c^2r^2}} + c2x + c3y + c4x^2 + c5xy + c6y^2 + c7x^3 +$$
$$c8x^2y + c9xy^2 + c10y^3 + c11x^4 + c12x^3y + c13x^2y^2 + c14xy^3 +$$
$$c15y^5 + c16x^5 + c17x^4y + c18x^3y^2 + c19x^2y^3 + c20xy^4 + c21y^5 +$$
$$c22x^6 + c23x^5y + c24x^4y^2 + c25x^3y^3 + c26x^2y^4 + c27xy^5 +$$
$$c28y^6 + c29x^7 + c30x^6y + c31x^5y^2 + c32x^4y^3 + c33x^3y^4 +$$
$$c34x^2y^5 + c35xy^6 + c36y^7 + c37x^8 + c38x^7y + c39x^6y^2 +$$
$$c40x^5y^3 + c41x^4y^4 + c42x^3y^5 + c43x^2y^6 + c44xy^7 + c45y^8$$

This function defines the shape of the $i^{th}$ surface on the basis of the local coordinates (x, y, z) of the $i^{th}$ surface.

When the terms with the odd order of x in the above function are set to 0, the shape defined by this function is symmetric about the yz plane.

In addition, the shape of each anamorphic aspheric surface included in the optical systems according to the embodiments is expressed as follows:

$$z = \frac{CUXx^2 + CUYy_i^2}{1+\{1-(1+KX)CUX^2x^2 - (1-KY)CUY^2y^2\}^{1/2}} +$$
$$AR\{(1-AP)x^2 + (1+AP)y^2\}^2 + BR\{(1-BP)x^2 + (1+BP)y^2\}^3 +$$
$$CR\{(1-CP)x^2 + (1+CP)y^2\}^4 + DR\{(1-DP)x^2 + (1+DP)y^2\}^5$$

The shape of each anamorphic aspheric surface is also defined on the basis of the corresponding local coordinate system.

In the embodiments, the vertex of each surface is only shifted along the y and z axes and tilted around the x axis. Accordingly, the original and local generatrix sections are on the same plane, while the original and local directrix sections are on different planes.

Tables 1 to 6 corresponding to Numerical Examples 1 to 6, respectively, show radii of curvature rx and ry of each optical surface at the origin of the local coordinate system (radii of curvature on the generatrix and directrix sections), a distance d (not converted to equivalent air distance) between hit points of light rays (reference light rays) on the $i^{th}$ and $(i+1)^{th}$ surfaces as a local surface gap, 'shift' and 'tilt' representing amounts of eccentricity, a refractive index nd, and an Abbe number vd, for each optical surface.

In addition, rotationally asymmetric surfaces (free-form surfaces) are denoted as "XYP", spherical surfaces are denoted as "SPH", and anamorphic aspherical surfaces are denoted as "AAS". Coefficients of the functions expressing these surfaces are shown in the lower section in each table. In addition, reflective surfaces are denoted as "M".

Numerical Example 1

The seventh surface corresponds to the scanning unit 104 according to the first embodiment. A horizontal deflection angle of the scanning unit (vibration angle in the vertical direction around an axis on the page) is ±6.67°. A vertical deflection angle of the scanning unit (vibration angle in the page around an axis perpendicular to the page) is ±5.00°. The numerical aperture of the light source is 0.05.

The relationship between the reference numerals used in FIG. 1 and surface numbers are as follows:

| Light-source unit 101 | Surface number 1 |
| Surface 103a | Surface number 2 |
| Surface 103b | Surface number 3 |
| Surface 103c | Surface number 4 |
| Reflective surface 110 | Surface number 5 |
| Scanning unit 104 | Surface number 7 |
| Scanning optical unit | |
| Reflective mirror 105a | Surface number 10 |
| Reflective mirror 105b | Surface number 11 |
| Scanning surface 106 | Surface number 13 |

TABLE 1

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 18.374 | 0.000 | 0.000 | 1.000 | |
| | 2 | 0.0000 | 18.3736 | 0.0000 | 66.6877 | 66.6877 | 1.000 | 0.000 | 0.000 | 1.699 | 30.13 |
| | 3 | 0.0000 | 19.3736 | 0.0000 | 9.8115 | 9.8115 | 2.000 | 0.000 | 0.000 | 1.639 | 55.38 |
| | 4 | 0.0000 | 21.3736 | 0.0000 | −13.8171 | −13.8171 | 4.000 | 0.000 | 0.000 | 1.000 | |
| M | 5 | 0.0000 | 25.37362 | 30.0000 | 0.0000 | 0.0000 | −14.000 | 0.000 | 30.000 | −1.000 | |
| | 6 | −24.2487 | 11.3736 | 70.0000 | 0.0000 | 0.0000 | 0.000 | −24.249 | 70.000 | −1.000 | |
| M | 7 | −24.2487 | 11.37362 | 70.0000 | 0.0000 | 0.0000 | 14.000 | −24.249 | 70.000 | 1.000 | |
| | 8 | 0.0000 | 25.3736 | 30.0000 | 0.0000 | 0.0000 | 0.000 | 0.000 | 30.000 | 1.000 | |
| | 9 | 0.0000 | 25.3736 | 50.0000 | 0.0000 | 0.0000 | −6.601 | 0.000 | 50.000 | 1.000 | |

TABLE 1-continued

| | | | | | | | | | | |
|---|---|---|---|---|---|---|---|---|---|---|
| XYP-M | 10 | −3.1511 | 18.77290 | 71.1910 | 0.0000 | 0.0000 | 1.452 | −3.151 | 71.191 | −1.000 |
| XYP-M | 11 | −17.6531 | 20.22450 | 26.6300 | 0.0000 | 0.0000 | −13.821 | −17.653 | 26.630 | 1.000 |
| | 12 | −11.5840 | 6.4031 | 0.7450 | 0.0000 | 0.0000 | 0.000 | −11.584 | 0.745 | 1.000 |
| | 13 | −11.5840 | 6.4031 | −1.4900 | 0.0000 | 0.0000 | 0.000 | −11.584 | −1.490 | 1.000 | surface No. 2
SPH rdy = 6.6688e+001
surface No. 3
SPH rdy = 9.8115e+000
surface No. 4
SPH rdy = −1.3817e+001
surface No. 10
XYP rdy = 1.0000e+018    c04 = −5.4079e−003    c06 = −3.3050e−003    c08 = 5.5191e−005
c10 = −2.8740e−005   c11 = 1.5528e−006     c13 = −4.0801e−006
c17 = 1.9252e−007    c19 = −1.1598e−006    c21 = 3.8345e−007     c22 = 0.0000e+000
c24 = 0.0000e+000    c26 = 0.0000e+000     c28 = 0.0000e+000
c30 = 0.0000e+000    c32 = 0.0000e+000     c34 = 0.0000e+000     c36 = 0.0000e+000
c37 = 0.0000e+000    c39 = 0.0000e+000     c41 = 0.0000e+000     c43 = 0.0000e+000    c45 = 0.0000e+000
surface No. 11
XYP rdy = 1.0000e+018    c04 = 9.4409e−003     c06 = 1.1758e−002     c08 = −2.5065e−004
c10 = 2.9310e−004    c11 = 4.5526e−006     c13 = −1.5841e−005
c17 = −3.0106e−008   c19 = 8.0596e−007     c21 = 2.1985e−007     c22 = 1.8279e−009
c24 = −1.6376e−008   c26 = 5.2743e−008     c28 = −3.9333e−009
c30 = 0.0000e+000    c32 = 0.0000e+000     c34 = 0.0000e+000     c36 = 0.0000e+000
c37 = 0.0000e+000    c39 = 0.0000e+000     c41 = 0.0000e+000     c43 = 0.0000e+000    c45 = 0.0000e+000
$\phi_{M1} = -90.9$    $\rho_{M1} = -125$    $\phi_{M2} = 47.6$    $\rho_{M2} = 55.9$
$\phi_{M1}/\phi_{M2} = 1.91$
$\rho_{M1}/\rho_{M2} = 2.24$
L1 = 20.00    L2 = 16.54
L1/L2 = 1.21

FIG. 12A show lateral aberration diagrams corresponding to positions on the scanning surface 106 shown in FIG. 12B. In the lateral aberration diagrams, the wavelengths are 656.27 nm, 587.56 nm, and 486.13 nm.

Numerical Example 2

The eleventh surface corresponds to the scanning unit 404 according to the second embodiment. The vertical deflection angle is ±5.00°. The length of the light-source unit 401 (in the direction perpendicular to the page) is 13 mm, and the number of light emitters in the light-source unit is 800. The numerical aperture of the light-source unit is 0.05.

In this numerical example, the scanning optical unit 105 is similar to that uses in Numerical Example 1. Therefore, coefficients of surface numbers 14 and 15 corresponding to the scanning optical unit 105 are not shown in the table.

The relationship between the reference numerals used in FIG. 4 and surface numbers are as follows:

| | |
|---|---|
| Light-source unit 401 | Surface number 1 |
| Surface 403a | Surface number 2 |
| Surface 403b | Surface number 3 |
| Surface 403c | Surface number 4 |
| Surface 403d | Surface number 5 |
| Surface 403e | Surface number 6 |
| Surface 403f | Surface number 7 |
| Surface 403g | Surface number 8 |
| Reflective surface 110 | Surface number 9 |
| Scanning unit 404 | Surface number 11 |
| Scanning optical unit | |
| Reflective mirror 105a | Surface number 14 |
| Reflective mirror 105b | Surface number 15 |
| Scanning surface 106 | Surface number 17 |

TABLE 2

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 16.574 | 0.000 | 0.000 | 1.000 | |
| | 2 | 0.0000 | 16.5739 | 0.0000 | −11.5542 | −11.5542 | 5.588 | 0.000 | 0.000 | 1.652 | 58.55 |
| | 3 | 0.0000 | 22.1621 | 0.0000 | −14.4616 | −14.4616 | 0.500 | 0.000 | 0.000 | 1.000 | |
| | 4 | 0.0000 | 22.6621 | 0.0000 | 192.7307 | 192.7307 | 1.000 | 0.000 | 0.000 | 1.847 | 23.78 |
| | 5 | 0.0000 | 23.6621 | 0.0000 | 27.6047 | 27.6047 | 6.543 | 0.000 | 0.000 | 1.603 | 60.64 |
| | 6 | 0.0000 | 30.2051 | 0.0000 | −42.3335 | −42.3335 | 0.500 | 0.000 | 0.000 | 1.000 | |

TABLE 2-continued

|       |    |          |          |         |          |          |         |          |         |        |       |
|-------|----|----------|----------|---------|----------|----------|---------|----------|---------|--------|-------|
|       | 7  | 0.0000   | 30.7051  | 0.0000  | 30.4020  | 30.4020  | 4.000   | 0.000    | 0.000   | 1.697  | 55.53 |
|       | 8  | 0.0000   | 34.7051  | 0.0000  | 389.3575 | 389.3575 | 4.000   | 0.000    | 0.000   | 1.000  |       |
| M     | 9  | 0.0000   | 38.70506 | 30.0000 | 0.0000   | 0.0000   | −14.000 | 0.000    | 30.000  | −1.000 |       |
|       | 10 | −24.2487 | 24.7051  | 70.0000 | 0.0000   | 0.0000   | 0.000   | −24.249  | 70.000  | −1.000 |       |
| M     | 11 | −24.2487 | 24.70506 | 70.0000 | 0.0000   | 0.0000   | 14.000  | −24.249  | 70.000  | 1.000  |       |
|       | 12 | 0.0000   | 38.7051  | 30.0000 | 0.0000   | 0.0000   | 0.000   | 0.000    | 30.000  | 1.000  |       |
|       | 13 | 0.0000   | 38.7051  | 50.0000 | 0.0000   | 0.0000   | −6.601  | 0.000    | 50.000  | 1.000  |       |
| XYP-M | 14 | −3.1511  | 32.10430 | 71.1910 | 0.0000   | 0.0000   | 1.452   | −3.151   | 71.191  | −1.000 |       |
| XYP-M | 15 | −17.6531 | 33.55600 | 26.6300 | 0.0000   | 0.0000   | −13.821 | −17.653  | 26.630  | 1.000  |       |
|       | 16 | −11.5840 | 19.7345  | 0.7450  | 0.0000   | 0.0000   | 0.000   | −11.584  | 0.745   | 1.000  |       |
|       | 17 | −11.5840 | 19.7345  | 0.7450  | 0.0000   | 0.0000   | 0.000   | −11.584  | 0.745   | 1.000  |       | surface No. 2
SPH rdy = −1.1554e+001
surface No. 3
SPH rdy = −1.4462e+001
surface No. 4
SPH rdy = 1.9273e+002
surface No. 5
SPH rdy = 2.7605e+001
surface No. 6
SPH rdy = −4.2334e+001
surface No. 7
SPH rdy = 3.0402e+001
surface No. 8
SPH rdy = 3.8936e+002

FIG. 13A show lateral aberration diagrams corresponding to positions on the scanning surface 106 shown in FIG. 13B. In the lateral aberration diagrams, the wavelengths are 656.27 nm, 587.56 nm, and 486.13 nm.

Numerical Example 3

In Numerical Example 3, optical system other than the ocular optical unit 701 is similar to those of Numerical Example 2. Therefore, only the values corresponding to the ocular optical unit 701 are shown. In the third embodiment, optical elements are explained in order from the light source. However, in this numerical example, values of the ocular optical unit 701 are described in order from the viewer's pupil along the light beam.

In this numerical example, the ocular optical unit is set such that the diagonal angle of view of the viewer is ±15°. The focal length and the entrance pupil diameter of the ocular optical unit are 21.8 mm and 6 mm, respectively.

The relationship between the reference numerals used in FIG. 7 and surface numbers are as follows:

| | |
|---|---|
| Pupil 702 | Surface number 1 |
| Surface 701a | Surface number 2 |
| Surface 701b | Surface number 3 |
| Surface 701c | Surface number 4 |
| Surface 701d | Surface number 5 |
| Surface 701e | Surface number 6 |
| Surface 701f | Surface number 7 |
| Surface 701g | Surface number 8 |
| Scanning surface 106 | Surface number 9 |

TABLE 3

| type | sur | Yg | Zg | θg | ry | rx | d | shift | tilt | nd | vd |
|------|-----|------|---------|--------|-----------|-----------|--------|-------|-------|-------|-------|
|      | 1   | 0.0000 | 0.0000  | 0.0000 | 0.0000    | 0.0000    | 23.992 | 0.000 | 0.000 | 1.000 |       |
|      | 2   | 0.0000 | 23.9919 | 0.0000 | −126.9189 | −126.9189 | 3.000  | 0.000 | 0.000 | 1.603 | 60.64 |
|      | 3   | 0.0000 | 26.9919 | 0.0000 | −28.8864  | −28.8864  | 0.300  | 0.000 | 0.000 | 1.000 |       |
|      | 4   | 0.0000 | 27.2919 | 0.0000 | 32.2965   | 32.2965   | 3.600  | 0.000 | 0.000 | 1.883 | 40.76 |
|      | 5   | 0.0000 | 30.8919 | 0.0000 | −123.8537 | −123.8537 | 0.300  | 0.000 | 0.000 | 1.000 |       |
|      | 6   | 0.0000 | 31.1919 | 0.0000 | 14.8234   | 14.8234   | 4.500  | 0.000 | 0.000 | 1.603 | 60.64 |
|      | 7   | 0.0000 | 35.6919 | 0.0000 | −111.9547 | −111.9547 | 0.600  | 0.000 | 0.000 | 1.847 | 23.78 |

TABLE 3-continued

| | | | | | | | | | |
|---|---|---|---|---|---|---|---|---|---|
| 8 | 0.0000 | 36.2919 | 0.0000 | 13.4095 | 13.4095 | 13.825 | 0.000 | 0.000 | 1.000 |
| 9 | 0.0000 | 50.1171 | 0.0000 | 0.0000 | 0.0000 | 0.000 | 0.000 | 0.000 | 1.000 | surface No. 2
SPH $rdy = -1.2692e+002$
surface No. 3
SPH $rdy = -2.8886e+001$
surface No. 4
SPH $rdy = 3.2297e+001$
surface No. 5
SPH $rdy = -1.2385e+002$
surface No. 6
SPH $rdy = 1.4823e+001$
surface No. 7
SPH $rdy = -1.1195e+002$
surface No. 8
SPH $rdy = 1.3410e+001$ FIGS. 14A to 14C show lateral aberration diagrams on the scanning surface obtained using the ocular optical unit of the present numerical example. FIGS. 14A, 14B, and 14C correspond to the angles of view of 0°, 7.5°, and 15°, respectively.

Numerical Example 4

The ninth surface corresponds to the scanning unit 104 according to the fourth embodiment. The horizontal deflection angle is ±6.67°, and the vertical deflection angle is ±5.00°. The numerical aperture of the light-source unit is 0.05.

In this numerical example, the scanning optical unit 105 is similar to that uses in Numerical Example 1. Therefore, coefficients of surface numbers 14 and 15 corresponding to the scanning optical unit 105 are not shown in the table.

The relationship between the reference numerals used in FIG. 8 and surface numbers are as follows:

| | |
|---|---|
| Light-source unit 801 | Surface number 1 |
| Reflective surface 804 | Surface number 2 |
| Entrance surface 803a | Surface number 3 |
| Reflective surface 803b | Surface number 4 |
| Reflective surface 803c | Surface number 5 |
| Reflective surface 803d | Surface number 6 |
| Scanning unit 104 | Surface number 9 |
| Scanning optical unit | |
| Reflective mirror 105a | Surface number 12 |
| Reflective mirror 105b | Surface number 13 |
| Scanning surface 106 | Surface number 15 |

TABLE 4

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 6.180 | 0.000 | 0.000 | 1.000 | |
| M | 2 | 0.0000 | 6.17962 | −10.0000 | 0.0000 | 0.0000 | −9.397 | 0.000 | −10.000 | −1.000 | |
| | 3 | 3.4202 | −3.2173 | −20.0000 | 16.1796 | 16.1796 | −6.578 | 3.420 | −20.000 | −1.530 | 55.80 |
| AAL-M | 4 | 5.8143 | −9.7951 | −50.0000 | 237.4374 | 121.0130 | 1.042 | 5.814 | −50.000 | 1.530 | 55.80 |
| M | 5 | −0.0945 | −8.7533 | −80.0000 | −76.4635 | −76.4635 | 3.500 | −0.095 | −80.000 | −1.530 | 55.80 |
| | 6 | 5.9677 | −5.2533 | −60.0000 | 0.0000 | 0.0000 | 12.500 | 5.968 | −60.000 | −1.000 | |
| | 7 | 27.6183 | 7.2467 | −60.0000 | 0.0000 | 0.0000 | 0.000 | 27.618 | −60.000 | −1.000 | |
| | 8 | 27.6183 | 7.2467 | −70.0000 | 0.0000 | 0.0000 | 0.000 | 27.618 | −70.000 | −1.000 | |
| M | 9 | 27.6183 | 7.2467 | −70.0000 | 0.0000 | 0.0000 | 0.000 | 27.618 | −70.000 | 1.000 | |
| | 10 | 27.6183 | 7.2467 | −60.0000 | 0.0000 | 0.0000 | 0.000 | 27.618 | −60.000 | 1.000 | |
| | 11 | 27.6183 | 7.2467 | −80.0000 | 0.0000 | 0.0000 | −7.399 | 27.618 | −80.000 | 1.000 | |
| XYP-M | 12 | 6.5207 | −0.1525 | −71.1905 | 0.0000 | 0.0000 | −1.452 | 6.521 | −71.190 | −1.000 | |

TABLE 4-continued

| | | | | | | | | | | |
|---|---|---|---|---|---|---|---|---|---|---|
| XYP-M | 13 | 21.0227 | −1.6041 | −26.6301 | 0.0000 | 0.0000 | 13.821 | 21.023 | −26.630 | 1.000 |
| | 14 | 14.9536 | 12.2173 | −0.7450 | 0.0000 | 0.0000 | 0.000 | 14.954 | −0.745 | 1.000 |
| | 15 | 14.9536 | 12.2173 | −0.7450 | 0.0000 | 0.0000 | 0.000 | 14.954 | −0.745 | 1.000 | surface No. 3
SPH $rdy = 1.6180e+001$ surface No. 4
AAL

| | | | |
|---|---|---|---|
| $rdy = 2.3744e+002$ | $ky = 0.0000e+000$ | $ar = 1.0972e-006$ | $br = 3.9619e-007$ |
| $cr = -1.5277e-007$ | $dr = 0.0000e+000$ | | |
| $rdx = 1.2101e+002$ | $kx = 0.0000e+000$ | $ap = -1.6510e-001$ | $bp = 3.8155e-001$ |
| $cp = 0.0000e+000$ | $dp = 0.0000e+000$ | | | surface No. 5
SPH $rdy = -7.6463e+001$ surface No. 6
SPH $rdy = 1.0000e+018$

Figure 15B:
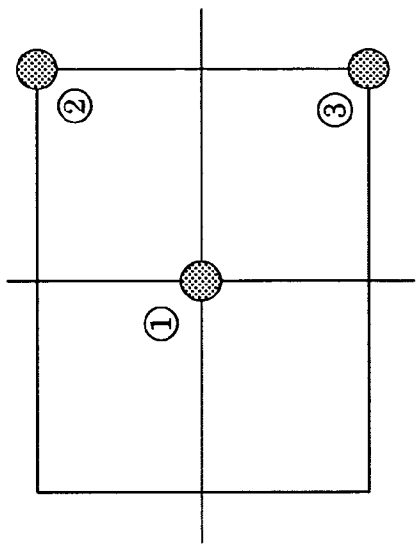
FIGS. 15A and 15B are diagrams showing lateral aberrations on a scanning surface according to the fourth embodiment (Numerical Example 4).
Figure 15A:
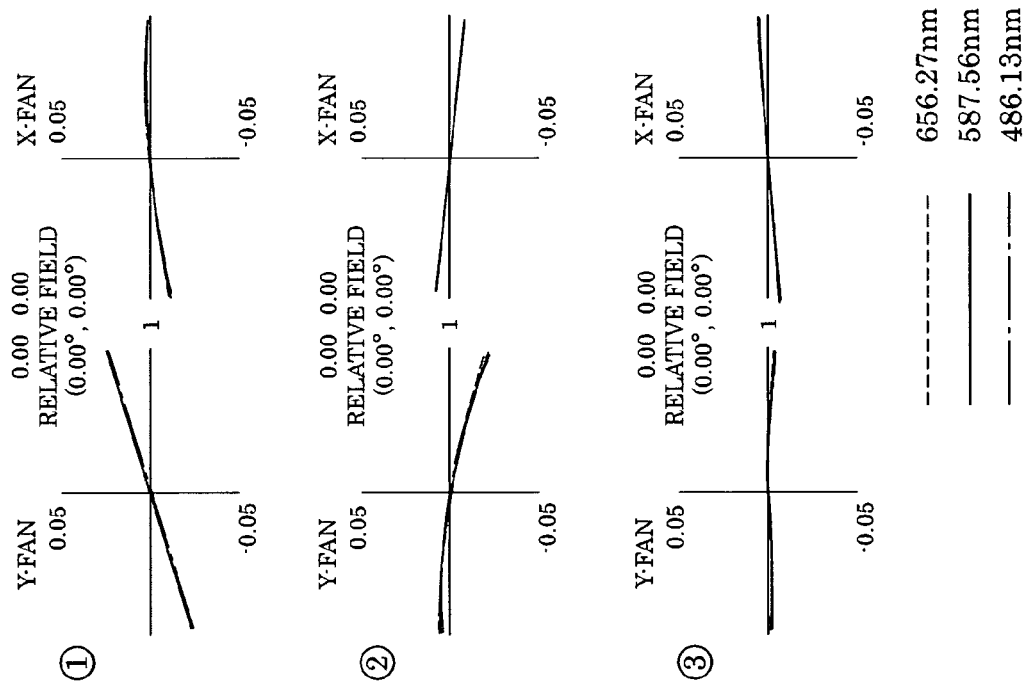

FIG. 15A show lateral aberration diagrams corresponding to positions on the scanning surface 106 shown in FIG. 15B. In the lateral aberration diagrams, the wavelengths are 656.27 nm, 587.56 nm, and 486.13 nm.

Numerical Example 5

The eighth surface corresponds to the scanning unit 904 according to the fifth embodiment. The vertical deflection angle is ±5.00°, and the horizontal deflection angle is ±3.31°. The length of the light-source unit 401 (in the direction perpendicular to the page) is 4 mm, and the number of light emitters in the light-source unit is 3. The numerical aperture of the light-source unit is 0.1.

The relationship between the reference numerals used in FIG. 9 and surface numbers are as follows:

| | |
|---|---|
| Light source unit 901 | Surface number 1 |
| Entrance surface 903a | Surface number 2 |
| Reflective surface 903b | Surface number 3 |
| Reflective surface 903c | Surface number 4 |
| Exit surface 903d | Surface number 5 |
| Scanning unit 904 | Surface number 8 |
| Scanning optical unit | |
| Reflective mirror 905a | Surface number 11 |
| Reflective mirror 905b | Surface number 12 |
| Scanning surface 906 | Surface number 14 |

TABLE 5A

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 2.974 | 0.000 | 0.000 | 1.000 | |
| XYP | 2 | −5.9063 | 2.9738 | 7.4707 | 0.0000 | 0.0000 | 8.539 | −5.906 | 7.471 | 1.530 | 55.80 |
| XYP-M | 3 | 5.1765 | 11.5128 | 28.6362 | 0.0000 | 0.0000 | −1.779 | 5.177 | 28.636 | −1.530 | 55.80 |
| XYP-M | 4 | −2.5718 | 9.7343 | −78.4751 | 0.0000 | 0.0000 | 4.849 | −2.572 | −78.475 | 1.530 | 55.80 |
| XYP | 5 | 6.5996 | 14.58346 | −68.6488 | 0.0000 | 0.0000 | −15.763 | 6.600 | −68.649 | 1.000 | |
| | 6 | 31.4761 | −1.1794 | −72.3920 | 0.0000 | 0.0000 | 0.000 | 31.476 | −72.392 | 1.000 | |
| | 7 | 31.4761 | −1.1794 | −83.9920 | 0.0000 | 0.0000 | 0.000 | 31.476 | −83.992 | 1.000 | |
| M | 8 | 31.4761 | −1.17939 | −83.9920 | 0.0000 | 0.0000 | 0.000 | 31.476 | −83.992 | −1.000 | |
| | 9 | 31.4761 | −1.1794 | −83.9920 | 0.0000 | 0.0000 | 0.000 | 31.476 | −83.992 | −1.000 | |
| | 10 | 31.4761 | −1.1794 | −84.4080 | 0.0000 | 0.0000 | −2.815 | 31.476 | −84.408 | −1.000 | |
| XYP-M | 11 | 11.5559 | −3.99477 | −59.5430 | 0.0000 | 0.0000 | 10.137 | 11.556 | −59.543 | 1.000 | |
| XYP-M | 12 | 23.9928 | 6.1423 | −14.9370 | 0.0000 | 0.0000 | −15.300 | 23.993 | −14.937 | −1.000 | |
| | 13 | 20.9546 | −9.1576 | 13.0670 | 0.0000 | 0.0000 | 0.000 | 20.955 | 13.067 | −1.000 | |
| | 14 | 20.9546 | −9.1576 | 13.0670 | 0.0000 | 0.0000 | 0.000 | 20.955 | 13.067 | −1.000 | | surface No. 2
XYP

| | | | | |
|---|---|---|---|---|
| $rdy = 1.0000e+018$ | $c03 = 7.0161E-01$ | $c04 = -1.0550e-001$ | $c06 = -9.5326e-004$ | $c08 = 1.3981e-003$ |
| $c10 = -2.2367e-003$ | $c11 = -1.6483e-004$ | $c13 = 1.2044e-003$ | | |
| $c17 = 2.6587e-004$ | $c19 = 9.3213e-006$ | $c21 = -4.4457e-005$ | $c22 = -7.2207e-006$ | |
| $c24 = -6.3837e-005$ | $c26 = -2.4673e-005$ | $c28 = 2.7192e-005$ | | |
| $c30 = 6.4719e-006$ | $c32 = -1.4231e-006$ | $c34 = 1.6601e-007$ | $c36 = -7.1435e-008$ | |

TABLE 5A-continued

| | | | | |
|---|---|---|---|---|
| c37 = −1.6928e−007 | c39 = −6.5680e−007 | c41 = 6.6540e−007 | c43 = −5.5512e−008 | c45 = −1.2453e−008 | surface No. 3
XYP

| | | | | |
|---|---|---|---|---|
| rdy = 1.0000e+018 | c03 = −1.5215E−01 | c04 = −6.5986e−003 | c06 = −2.8094e−003 | c08 = −7.3621e−004 |
| c10 = 1.4320e−003 | c11 = 1.2106e−005 | c13 = −1.4256e−005 | | |
| c17 = −4.4691e−007 | c19 = 5.0689e−006 | c21 = 4.6168e−006 | c22 = −1.4029e−009 | |
| c24 = −2.8425e−007 | c26 = 4.8234e−008 | c28 = 8.4455e−008 | | |
| c30 = −1.1032e−010 | c32 = −2.7222e−008 | c34 = 1.2763e−008 | c36 = −2.1219e−008 | |
| c37 = 0.0000e+000 | c39 = 0.0000e+000 | c41 = 0.0000e+000 | c43 = 0.0000e+000 | c45 = 0.0000e+000 | surface No. 4
XYP

| | | | | |
|---|---|---|---|---|
| rdy = 1.0000e+018 | c03 = −6.2910E−02 | c04 = −1.1212e−002 | c06 = 1.3831e−003 | c08 = −6.9942e−004 |
| c10 = 2.3107e−003 | c11 = −1.8199e−006 | c13 = −3.5462e−005 | | |
| c17 = 1.9685e−006 | c19 = −7.5085e−007 | c21 = 9.4370e−006 | c22 = 1.0314e−008 | |
| c24 = 9.9620e−008 | c26 = −7.8700e−007 | c28 = −2.3780e−006 | | |
| c30 = 0.0000e+000 | c32 = 0.0000e+000 | c34 = 0.0000e+000 | c36 = 0.0000e+000 | |
| c37 = 0.0000e+000 | c39 = 0.0000e+000 | c41 = 0.0000e+000 | c43 = 0.0000e+000 | c45 = 0.0000e+000 |

TABLE 5B surface No. 5
XYP

| | | | | |
|---|---|---|---|---|
| rdy = 1.0000e+018 | c03 = 6.4113E−03 | c04 = −4.2004e−003 | c06 = 7.2345e−003 | c08 = 1.2813e−003 |
| c10 = −5.3253e−004 | c11 = 9.9908e−005 | c13 = 2.2096e−004 | | |
| c17 = 8.5592e−006 | c19 = −1.9410e−006 | c21 = −2.2656e−006 | c22 = 2.1425e−008 | |
| c24 = −4.3809e−007 | c26 = −8.0324e−007 | c28 = −6.7907e−007 | | |
| c30 = 0.0000e+000 | c32 = 0.0000e+000 | c34 = 0.0000e+000 | c36 = 0.0000e+000 | |
| c37 = 0.0000e+000 | c39 = 0.0000e+000 | c41 = 0.0000e+000 | c43 = 0.0000e+000 | c45 = 0.0000e+000 | surface No. 11
XYP

| | | | | |
|---|---|---|---|---|
| rdy = 1.0000e+018 | c03 = 4.6916E−02 | c04 = −6.5899e−003 | c06 = −5.9839e−003 | c08 = 9.8325e−005 |
| c10 = 3.9442e−005 | c11 = 4.0921e−006 | c13 = 1.8769e−007 | | |
| c17 = 3.5963e−007 | c19 = −6.3563e−007 | c21 = −3.6955e−008 | c22 = 6.6540e−008 | |
| c24 = −4.4934e−008 | c26 = −2.3695e−008 | c28 = 4.0463e−009 | | |
| c30 = −1.0555e−009 | c32 = −21584e−009 | c34 = 8.4415e−009 | c36 = −1.2617e−009 | |
| c37 = −3.2016e−010 | c39 = 1.5225e−009 | c41 = −1.6833e−010 | c43 = −2.3978e−010 | c45 = 1.3390e−010 | surface No. 12
XYP

| | | | | |
|---|---|---|---|---|
| rdy = 1.0000e+018 | c03 = −1.6694E−02 | c04 = 8.3663e−003 | c06 = 9.4733e−003 | c08 = 4.6503e−005 |
| c10 = −1.2303e−004 | c11 = 4.6527e−006 | c13 = −2.0890e−007 | | |
| c17 = 7.1369e−007 | c19 = −8.1947e−009 | c21 = −2.0702e−007 | c22 = 9.7216e−008 | |
| c24 = −6.8558e−008 | c26 = 1.0455e−007 | c28 = 2.6543e−008 | | |
| c30 = −1.3990e−008 | c32 = 1.0522e−009 | c34 = −1.3669e−008 | c36 = −2.1362e−009 | |
| c37 = −2.2182e−010 | c39 = 1.0714e−009 | c41 = 6.4729e−012 | c43 = 4.4987e−010 | c45 = 5.8786e−011 |
| $\phi_{M1}$ = −76.9 | $\rho_{M1}$ = −85.5 | $\phi_{M2}$ = 55.6 | $\rho_{M2}$ = 65.4 | |
| $\phi_{M1}/\phi_{M2}$ = 1.38 | | | | |
| $\rho_{M1}/\rho_{M2}$ = 1.31 | | | | |
| L1 = 20.54 | L2 = 17.13 | | | |
| L1/L2 = 1.20 | | | | |

Figure 16B:
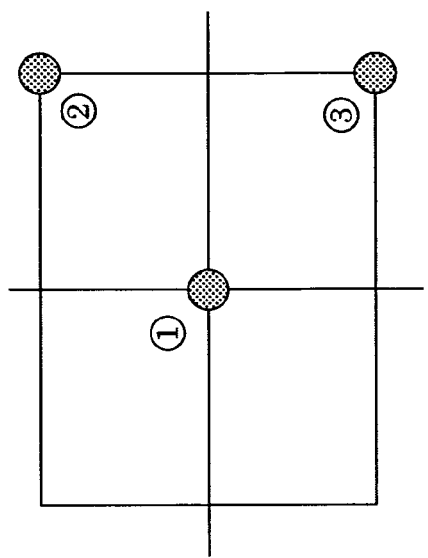
FIGS. 16A and 16B are diagrams showing lateral aberrations on a scanning surface according to the fifth embodiment (Numerical Example 5).
Figure 16A:
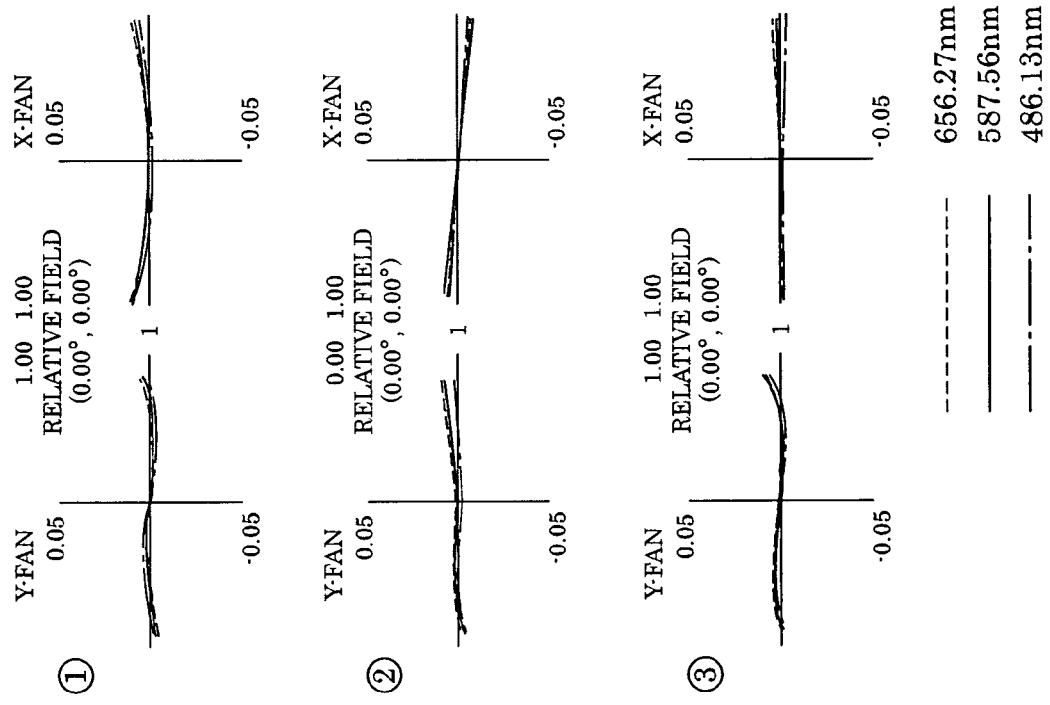

FIG. 16A show lateral aberration diagrams corresponding to positions on the scanning surface 106 shown in FIG. 16B. In the lateral aberration diagrams, the wavelengths are 656.27 nm, 587.56 nm, and 486.13 nm.

Numerical Example 6

In Numerical Example 6, optical systems other than the ocular optical unit 1102 are similar to those of Numerical Example 5. Therefore, only the values corresponding to the ocular optical unit 1102 are shown. In the fifth embodiment, optical elements are explained in order from the light source. However, in this numerical example, values of the ocular optical unit 1102 are described in order from the viewer's pupil along the light beam.

In this numerical example, the ocular optical unit is set such that the diagonal angle of view of the viewer is ±15°. The focal length and the entrance pupil diameter of the ocular optical unit are 19.0 mm and 7 mm, respectively.

The relationship between the reference numerals used in FIG. 11 and surface numbers are as follows:

| | |
|---|---|
| Pupil 1103 | Surface number 1 |
| Surface 1102a | Surface number 3 |
| Surface 1102b | Surface number 4 |
| Surface 1102c | Surface number 5 |
| Surface 1102d | Surface number 6 |
| Surface 1102e | Surface number 7 |
| Surface 1102f | Surface number 8 |
| Surface 1102g | Surface number 9 |
| Surface 1101a | Surface number 10 |
| Scanning surface 906 | Surface number 12 |

TABLE 6

| type | sur | Yg | Zg | θg | ry | rx | d | shift | tilt | nd | νd |
|---|---|---|---|---|---|---|---|---|---|---|---|
| | 1 | 0.0000 | 0.0000 | 0.0000 | 0.0000 | 0.0000 | 20.000 | 0.000 | 0.000 | 1.000 | |
| | 2 | 0.0000 | 20.0000 | 0.0000 | 0.0000 | 0.0000 | 0.000 | 0.000 | 0.000 | 1.000 | |
| | 3 | 0.0000 | 20.0000 | 0.0000 | 80.2726 | 80.2726 | 5.300 | 0.000 | 0.000 | 1.487 | 70.24 |
| | 4 | 0.0000 | 25.3000 | 0.0000 | −35.9905 | −35.9905 | 4.000 | 0.000 | 0.000 | 1.000 | |
| | 5 | 0.0000 | 29.3000 | 0.0000 | 28.6683 | 28.6683 | 5.100 | 0.000 | 0.000 | 1.603 | 60.64 |
| | 6 | 0.0000 | 34.4000 | 0.0000 | −59.8661 | −59.8661 | 0.100 | 0.000 | 0.000 | 1.000 | |
| | 7 | 0.0000 | 34.5000 | 0.0000 | 13.5345 | 13.5345 | 8.000 | 0.000 | 0.000 | 1.694 | 53.20 |
| | 8 | 0.0000 | 42.5000 | 0.0000 | −19.5408 | −19.5408 | 1.257 | 0.000 | 0.000 | 1.805 | 25.42 |
| | 9 | 0.0000 | 43.7571 | 0.0000 | 8.0300 | 8.0300 | 2.500 | 0.000 | 0.000 | 1.000 | |
| | 10 | 0.0000 | 46.2571 | 0.0000 | 0.0000 | 0.0000 | 1.000 | 0.000 | 0.000 | 1.516 | 64.14 |
| | 11 | 0.0000 | 47.2571 | 0.0000 | 0.0000 | 0.0000 | 2.043 | 0.000 | 0.000 | 1.000 | |
| | 12 | 0.0000 | 49.2997 | 0.0000 | 0.0000 | 0.0000 | 0.000 | 0.000 | 0.000 | 1.000 | | surface No. 3
SPH rdy = 8.0273e+001
surface No. 4
SPH rdy = −3.5990e+001
surface No. 5
SPH rdy = 2.8668e+001
surface No. 6
SPH rdy = −5.9866e+001
surface No. 7
SPH rdy = 1.3534e+001
surface No. 8
SPH rdy = −1.9541e+001
surface No. 9
SPH rdy = 8.0300e+000
surface No. 10
SPH rdy = 1.0000e+018

FIGS. 17A to 17C show lateral aberration diagrams on the scanning surface obtained using the ocular optical unit of the present numerical example. FIGS. 17A, 17B, and 17C correspond to the angles of view of 0°, 7.5°, and 15°, respectively.

Figure 19A:
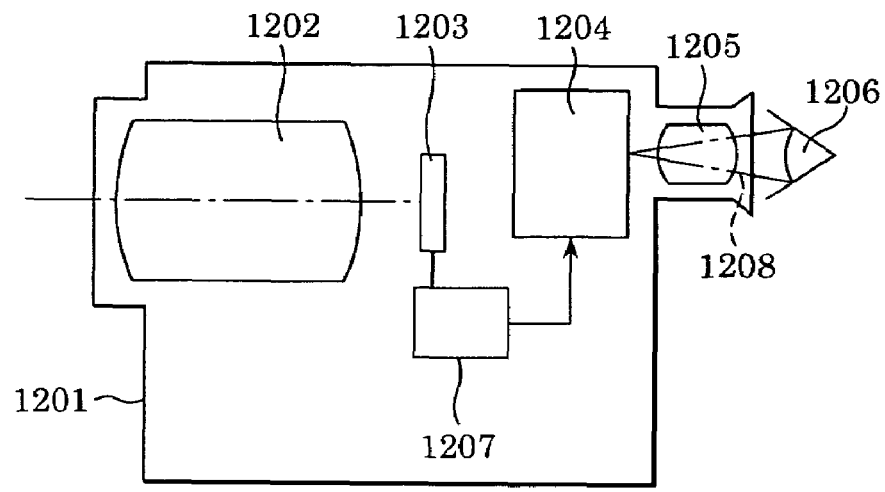
FIG. 19A is a diagram showing an example of an imaging apparatus in which display optical systems according to the embodiments can be mounted.

FIG. 19A shows an example of an imaging apparatus, such as a digital still camera and a video camera, in which the display optical systems according to the above-described embodiments can be installed. With reference to FIG. 19A, the imaging apparatus includes a main body 1201, an imaging optical system 1202, and an imaging device (photoelectric transducer) 1203 which performs photoelectric conversion of an object image formed by the imaging optical system 1202. An output signal from the imaging device 1203 is converted into an imaging signal (video signal) by an image processing circuit 1207, and is then input to a modulation circuit (see FIG. 1) in a scanning display device 1204 including the display optical system according to any of the above-described embodiments. The light-source unit included in the display optical system is modulated in accordance with the imaging signal, and the scanning unit is operated in synchronization with the modulation. Accordingly, a scanning light beam 1208 is emitted from the display optical system to form an areal image (two-dimensional image) on a scanning surface (not shown). Then, the virtual image of the areal image is observed by a viewer's eye (pupil) 1206 via the ocular optical unit 1205.

Figure 19B:
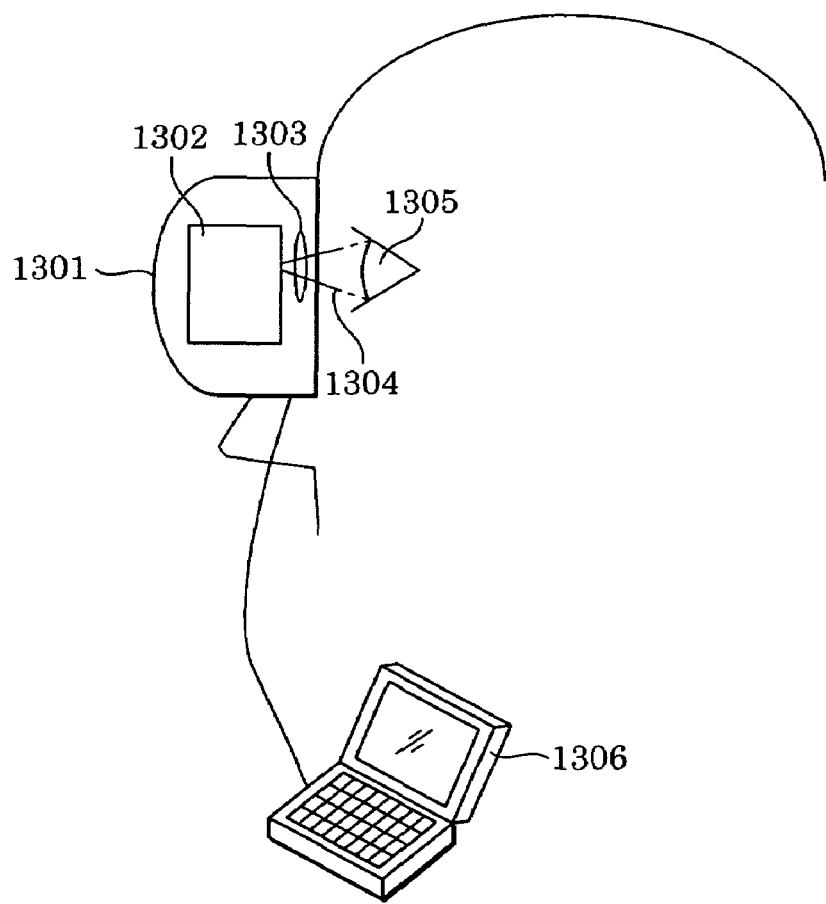
FIG. 19B is a diagram showing an example of an image display apparatus in which the display optical systems can be mounted.

FIG. 19B shows an example of an image display apparatus, such as a head mount display, in which the display optical systems according to the above-described embodiments can be installed. With reference to FIG. 19B, a head mount display includes a main body 1301 attached to the head of a viewer and a scanning display device 1302 contained in the main body 1301 and including the display optical system according to any of the above-described embodiments. The scanning display device 1302 is connected to an image information supply device 1306, such as a personal computer, and a video signal is input to a modulation circuit (see FIG. 1) in a scanning display device 1302 from the image information supply device 1306. The light-source unit included in the display optical system is modulated in accordance with the video signal, and the scanning unit is operated in synchronization with the modulation. Accordingly, a scanning light beam 1304 is emitted from the display optical system to form an areal image (two-dimensional image) on a scanning surface (not shown). Then, the virtual image of the areal image is observed by a view's eye (pupil) 1305 via the ocular optical unit 1303.

In both of the apparatuses shown in FIGS. 19A and 19B, the display optical systems (the scanning display devices 1204 and 1302) are small and capable of displaying high-quality images. Accordingly, the sizes of the apparatuses can be reduced and the qualities thereof can be increased.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-170481 filed Jun. 8, 2004, which is hereby incorporated by reference herein.

What is claimed is:

1. A display optical system comprising:
   a light-source unit configured to emit a light beam;
   a first optical unit which collects the light beam from the light-source unit;
   a scanning member which scans the light beam from the first optical unit; and
   a second optical unit which focuses the light beam scanned by the scanning member on about a scanning surface, the second optical unit including two reflective mirrors having positive optical powers,
   wherein an optical axis, defined by an optical path along which a light ray travels from a center of the scanning member to a center of the scanning surface via the second optical unit, intersects itself.

2. The display optical system according to claim 1, wherein the two reflective mirrors include a first reflective mirror and a second reflective mirror disposed in that order in a travel direction of the light ray, and a distance from the scanning member to the first reflective mirror along the optical axis is longer than a distance from the second reflective mirror to the scanning surface along the optical axis.

3. The display optical system according to claim 1, wherein the two reflective mirrors include a first reflective mirror and a second reflective mirror disposed in that order in a travel direction of the light ray, and
   wherein a distance from the scanning member to the first reflective mirror along the optical axis (L1) and a distance from the second reflective mirror to the scanning surface along the optical axis (L2) satisfy the following expression:

$0.6 < L1/L2 < 1.5$.

4. The display optical system according to claim 1, wherein the light beam from the first optical unit travels between the two reflective mirrors before reaching the scanning member.

5. The display optical system according to claim 1, further comprising an ocular optical unit positioned opposite to the second optical unit and across the scanning surface.

6. The display optical system according to claim 1, wherein the two reflective mirrors include a first reflective mirror and a second reflective mirror disposed in that order in a travel direction of the light ray, the first and second reflective mirrors being eccentric with respect to the optical axis, and
   wherein radii of curvature of the first mirror in XZ and YZ planes, respectively, on the optical axis ($\phi_{M1}$ and $\rho_{M1}$) and radii of curvature of the second mirror in the XZ and YZ planes, respectively, on the optical axis, ($\phi_{M2}$ and $\rho_{M2}$), the YZ plane being a plane along which each reflective mirror is eccentric and the XZ plane being a plane along which each reflective mirror is not eccentric, satisfying the following expressions:

$0.8 < \phi_{M1}/\phi_{M2} < 3$ $0.8 < \rho_{M1}/\rho_{M2} < 3$.

7. The display optical system according to claim 1, wherein at least one of the two reflective mirrors has no axis of rotational symmetry.

8. An image display apparatus comprising:
   the display optical system according to claim 1; and
   a modulation circuit which modulates the light-source unit on the basis of an image signal.

9. An imaging apparatus comprising:
   an imaging optical system configured to form an object image;
   a photoelectric transducer which performs photoelectric conversion of the object image; and
   the display optical system according to claim 1 which forms an image on the scanning surface on the basis of an image signal from the photoelectric transducer.

10. A display optical system comprising:
    a light-source unit configured to emit a light beam;
    a first optical unit collecting the light beam from the light-source unit and having surfaces, including an entrance surface, an exit surface, and two reflective surfaces, the surfaces surrounding an area filled with a medium with a refractive index of more than 1;
    a scanning member which scans the light beam from the first optical unit; and
    a second optical unit which focuses the light beam scanned by the scanning member on about a scanning surface, the second optical unit including two reflective mirrors,
    wherein an optical axis, defined by an optical path along which a light ray travels from a center of the scanning member to a center of the scanning surface via the second optical unit intersects itself.

11. The display optical system according to claim 10, wherein the two reflective mirrors include a first reflective mirror and a second reflective mirror disposed in that order in a travel direction of the light ray, and wherein a distance from the scanning member to the first reflective mirror along the optical axis is longer than a distance from the second reflective mirror to the scanning surface along the optical axis.

12. The display optical system according to claim 10, wherein the two reflective mirrors include a first reflective mirror and a second reflective mirror disposed in that order in a travel direction the light ray, and
    wherein a distance from the scanning member to the first reflective mirror along the optical axis (L1) and a distance from the second reflective mirror to the scanning surface along the optical axis (L2) satisfy the following expression:

$0.6 < L1/L2 < 1.5$.

13. The display optical system according to claim 10, wherein the light beam from the first optical unit travels between the two reflective mirrors before reaching the scanning member.

14. The display optical system according to claim 10, further comprising an ocular optical unit positioned opposite to the second optical unit and across the scanning surface.

15. The display optical system according to claim 10, wherein the two reflective mirrors include a first reflective mirror and a second reflective mirror disposed in that order in a travel direction of the light ray, the first and second reflective mirrors being eccentric with respect to the optical axis, and wherein radii of curvature of the first mirror in XZ and YZ planes, respectively, on the optical axis ($\phi_{M1}$ and $\rho_{M1}$) and radii of curvature of the second mirror in the XZ and YZ planes, respectively, on the optical axis, ($\phi_{M2}$ and $\rho_{M2}$), the YZ plane being a plane along which each reflective mirror is eccentric and the XZ plane being a plane along which each reflective mirror is not eccentric, satisfying the following expressions:

$$0.8 < \phi_{M1}/\phi_{M2} < 3$$

$$0.8 < \rho_{M1}/\rho_{M2} < 3.$$

16. The display optical system according to claim 10, wherein at least one of the two reflective mirrors has no axis of rotational symmetry.

17. An image display apparatus comprising:
the display optical system according to claim 10; and
a modulation circuit which modulates the light-source unit on the basis of an image signal.

18. An imaging apparatus comprising:
an imaging optical system configured to form an object image;
a photoelectric transducer which performs photoelectric conversion of the object image formed by the imaging optical system; and
the display optical system according to claim 10 which forms an image on the scanning surface on the basis of an image signal from the photoelectric transducer.

* * * * *